US011588585B2

(12) United States Patent
Shao et al.

(10) Patent No.: US 11,588,585 B2
(45) Date of Patent: Feb. 21, 2023

(54) METHODS AND APPARATUS FOR TRANSMITTING INFORMATION ON TWO PDSCHS

(71) Applicant: Huawei Technologies Co., Ltd., Shenzhen (CN)

(72) Inventors: Jiafeng Shao, Beijing (CN); Yongxia Lyu, Ottawa (CA); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 16/925,593

(22) Filed: Jul. 10, 2020

(65) Prior Publication Data

US 2020/0344009 A1    Oct. 29, 2020

Related U.S. Application Data

(63) Continuation of application No. PCT/CN2019/071482, filed on Jan. 11, 2019.

(30) Foreign Application Priority Data

Jan. 12, 2018 (CN) .......................... 201810032508.8

(51) Int. Cl.
*H04L 1/18* (2006.01)
*H04L 1/1812* (2023.01)
(Continued)

(52) U.S. Cl.
CPC .......... *H04L 1/1819* (2013.01); *H04L 5/0055* (2013.01); *H04L 5/0092* (2013.01);
(Continued)

(58) Field of Classification Search
CPC ... H04L 1/1819; H04L 5/0055; H04L 5/0092; H04W 72/0446; H04W 72/0453; H04W 76/11; H04W 72/042
See application file for complete search history.

(56) References Cited

U.S. PATENT DOCUMENTS

2007/0195809 A1\* 8/2007 Blanz .................... H04W 48/12
370/426
2011/0085493 A1\* 4/2011 Chang ................... H04L 1/0038
370/328
(Continued)

FOREIGN PATENT DOCUMENTS

| CN | 102006623 A | 4/2011 |
|---|---|---|
| CN | 102013948 A | 4/2011 |

(Continued)

OTHER PUBLICATIONS

3rd Generation Partnership Project; Technical Specification Group Services and System Aspects; Service requirements for the 5G system; Stage 1(Release 16), 3GPP TS 22.261 V16.2.0 (Dec. 2017), 53 pages.

(Continued)

*Primary Examiner* — Jael M Ulysse
(74) *Attorney, Agent, or Firm* — Slater Matsil, LLP

(57) ABSTRACT

This application provides an information transmission method and apparatus. The solution includes: determining, by a terminal device, at least two transport blocks; and decoding, by the terminal device, first information transmitted by using the at least two transport blocks, where the first information includes at least one of control information and data. This solution is applicable to a scenario in which same information or information with a same information source is transmitted by using a plurality of transport blocks.

15 Claims, 7 Drawing Sheets

(51) Int. Cl.
*H04W 76/11* (2018.01)
*H04L 5/00* (2006.01)
*H04W 72/04* (2023.01)
*H04W 72/0446* (2023.01)
*H04W 72/0453* (2023.01)

(52) U.S. Cl.
CPC ..... *H04W 72/042* (2013.01); *H04W 72/0446* (2013.01); *H04W 72/0453* (2013.01); *H04W 76/11* (2018.02)

(56) References Cited

U.S. PATENT DOCUMENTS

| | | | |
|---|---|---|---|
| 2011/0149886 A1* | 6/2011 | Xu | H04B 7/0628 370/328 |
| 2013/0195041 A1* | 8/2013 | Papasakellariou | H04W 72/042 370/329 |
| 2014/0022967 A1* | 1/2014 | Yang | H04L 1/1607 370/280 |
| 2014/0056184 A1* | 2/2014 | Yang | H04L 1/1861 370/280 |
| 2015/0156764 A1* | 6/2015 | Yang | H04L 1/1861 370/329 |
| 2015/0245344 A1* | 8/2015 | You | H04L 1/1861 370/280 |
| 2016/0100422 A1* | 4/2016 | Papasakellariou | H04L 1/1861 370/329 |
| 2016/0135143 A1* | 5/2016 | Won | H04W 12/08 370/312 |
| 2016/0345301 A1* | 11/2016 | Webb | H04W 72/0446 |
| 2016/0345314 A1* | 11/2016 | Webb | H04W 52/146 |
| 2017/0105166 A1* | 4/2017 | Lee | H04W 72/042 |
| 2017/0373741 A1* | 12/2017 | Yang | H04L 1/18 |
| 2018/0019836 A1* | 1/2018 | Kim | H04J 11/0079 |
| 2018/0019843 A1* | 1/2018 | Papasakellariou | H04L 5/0055 |
| 2018/0123769 A1* | 5/2018 | Pelletier | H04L 5/001 |
| 2018/0124815 A1* | 5/2018 | Papasakellariou | H04L 1/1671 |
| 2018/0279380 A1* | 9/2018 | Jung | H04W 56/0005 |
| 2018/0310281 A1* | 10/2018 | Takeda | H04W 72/042 |
| 2018/0376498 A1* | 12/2018 | Bhattad | H04L 1/1861 |
| 2019/0020506 A1* | 1/2019 | Cheng | H04L 1/1819 |
| 2019/0223204 A1* | 7/2019 | Kim | H04W 72/14 |
| 2020/0221428 A1* | 7/2020 | Moon | H04B 7/024 |
| 2020/0266934 A1* | 8/2020 | Yang | H04L 5/0055 |
| 2020/0322979 A1* | 10/2020 | Chatterjee | H04L 5/001 |

FOREIGN PATENT DOCUMENTS

| | | |
|---|---|---|
| CN | 102223205 A | 10/2011 |
| CN | 102598570 A | 7/2012 |
| CN | 105703891 A | 6/2016 |
| WO | 2006039635 A2 | 4/2006 |
| WO | 2011026425 A1 | 3/2011 |
| WO | 2013163895 A1 | 11/2013 |
| WO | 2016106489 A1 | 7/2016 |
| WO | 2017074243 A1 | 5/2017 |
| WO | 2017146287 A1 | 8/2017 |
| WO | 2018160108 A1 | 9/2018 |

OTHER PUBLICATIONS

Intel Corporation, "Support of NC-JT in NR", 3GPP TSG RAN WG1 Meeting #88bis, R1-1704722, Spokane, WA, USA, Apr. 3-7, 2017, 3 pages.

3rd Generation Partnership Project; Technical Specification Group Radio Access Network; NR; Multiplexing and channel coding (Release 15), 3GPP TS 38.212 V15.0.0 (Dec. 2017), 82 pages.

3rd Generation Partnership Project; Technical Specification Group Radio Access Network; NR; Physical layer procedures for control (Release 15), 3GPP TS 38.213 V15.0.0 (Dec. 2017), 56 pages.

3rd Generation Partnership Project; Technical Specification Group Radio Access Network; NR; Physical layer procedures for data (Release 15), 3GPP TS 38.214 V15.0.0 (Dec. 2017), 71 pages.

3rd Generation Partnership Project; Technical Specification Group Radio Access Network; NR; Medium Access Control (MAC) protocol specification (Release 15), 3GPP TS 38.321 V15.0.0 (Dec. 2017), 55 pages.

3rd Generation Partnership Project; Technical Specification Group Radio Access Network; NR; Radio Resource Control (RRC) protocol specification (Release 15), 3GPP TS 38.331 V15.0.0 (Dec. 2017), 188 pages.

NTT Docomo, Inc.,"Scheduling and HARQ procedures for URLLC", 3GPP TSG RAN WG1 Meeting 90bis R1-1718222, Prague, CZ, Oct. 9-13, 2017, 4 pages.

Wang, Z. et al. "Multiple data streams joint ARQ for the unicast wireless link", Journal of Xidian University, Aug. 2011, vol. 38, No. 4, with an English abstract, 6 pages.

Ericsson et al., "Text Proposal on Network Assisted Interference Cancellation", 3GPP TSG RAN WG1 Meeting #74 R1-133945, Barcelona, Spain, Aug. 19-23, 2013, 8 pages.

* cited by examiner

METHODS AND APPARATUS FOR TRANSMITTING INFORMATION ON TWO PDSCHS

CROSS-REFERENCE TO RELATED APPLICATIONS

This application is a continuation of International Application No. PCT/CN2019/071482, filed on Jan. 11, 2019, which claims priority to Chinese Patent Application No. 201810032508.8, filed on Jan. 12, 2018. The disclosures of the aforementioned applications are hereby incorporated by reference in their entireties.

TECHNICAL FIELD

This application relates to the field of communications technologies, and in particular, to an information transmission method and apparatus.

BACKGROUND

To cope with explosive growth of mobile data traffic in the future, massive mobile communications device connections, and various new services and application scenarios, fifth generation (5G) mobile communications systems emerge. The international telecommunication union (ITU) defines ultra-reliable low-latency communication (URLLC) service scenarios for 5G and future mobile communications systems. A URLLC service has an extremely high requirement on a latency. A latency in unidirectional transmission from a transmit end to a receive end needs to be within 0.5 millisecond (ms). Transmission reliability needs to reach 99.999% when the latency is within 1 ms.

In a 5G new radio (NR) system and a long term evolution (LTE) system, usually, to improve reliability of receiving a service by the receive end, a data packet may be sent to the receive end for the first time at the transmit end (which is referred to as initial transmission for short). However, the receive end cannot normally receive the data packet or cannot correctly parse the data packet. In this case, the receive end uses a retransmission mechanism (for example, hybrid automatic repeat request (HARQ)) to require the transmit end to retransmit the data packet (which is referred to as retransmission for short). Alternatively, when the receive end still cannot receive the retransmitted data packet or cannot correctly parse the retransmitted data packet, the transmit end may retransmit the data packet again. Finally, the transmit end performs combined decoding on the initially transmitted data packet and the retransmitted data packet or the data packet retransmitted for a plurality of times, to improve performance of the receive end. For example, if an error rate of one-time transmission is 0.1, and combined decoding is not performed on second retransmission, error rates of the two times of transmission are two independent events that are not related to each other. Then, an error rate after the two times of transmission is 0.01 (0.1×0.1). When combined decoding can be performed, an error rate of first transmission is still 0.1, and an error rate of second transmission may be improved to be less than 0.1 (where a specific value depends on an algorithm used by the receive end) by using information in the previous transmission. In this way, an error rate of the two times of transmission is less than 0.1×0.1.

Therefore, how to reduce a transmission latency while improving transmission reliability is a technical problem that needs to be resolved urgently in a future communications system.

SUMMARY

This application provides an information transmission method and apparatus, to improve downlink transmission reliability.

To achieve the foregoing objective, the embodiments of this application provide the following technical solutions.

According to a first aspect, this application provides an information transmission method, including: determining, by a terminal device, at least two transport blocks; and decoding, by the terminal device, first information transmitted by using the at least two transport blocks, where the first information includes at least one of control information and data, where the decoding, by the terminal device, first information transmitted by using the at least two transport blocks includes: decoding, by the terminal device, at least one transport block in the at least two transport blocks, to obtain the first information; or performing, by the terminal device, combined decoding on a plurality of transport blocks in the at least two transport blocks, to obtain the first information.

According to the information transmission method provided in this application, the terminal device determines the at least two transport blocks, and decodes the first information transmitted by using the at least two transport blocks. In this way, when sending information, for example, the first information, to the terminal device, a network device may send the first information to the terminal device by using the at least two transport blocks, thereby improving reliability of receiving the first information by the terminal device. On the other hand, because the first information is carried in a plurality of transport blocks, the first information may be sent to the terminal device by using the plurality of transport blocks transmitted in a period of time or at the same time, so that a transmission latency can be reduced.

With reference to the first aspect, in a first possible implementation of the first aspect, the determining, by a terminal device, at least two transport blocks includes: determining, by the terminal device, first indication information, where the first indication information is used to indicate parameter values of at least one parameter corresponding to the at least two transport blocks, and the at least one parameter includes one or more of the following parameters: a first time period; a bandwidth part BWP; a precoding matrix parameter; a network identifier; a reference signal; a cell index; and a combination identifier, where the combination identifier is used to indicate a transport block used for combined decoding; and determining, by the terminal device, the at least two transport blocks based on the first indication information. The terminal device determines the at least two transport blocks based on the first indication information, so that the terminal device can perform combined decoding on the first information in the at least two transport blocks when receiving the at least two transport blocks.

With reference to the first aspect or the first possible implementation of the first aspect, in a second possible implementation of the first aspect, the at least two transport blocks include a first transport block and a second transport block; the first indication information indicates that a first parameter in the at least one parameter corresponds to a plurality of parameter values, and parameter values of the first parameter corresponding to the first transport block and the second transport block are different; and/or the first indication information indicates that a second parameter in the at least one parameter corresponds to one parameter value, and parameter values of the second parameter corresponding to the first transport block and the second transport block are the same.

In a possible implementation, the first indication information is used to indicate a combination identifier corresponding to the at least two transport blocks, and the determining, by the terminal device, the at least two transport blocks based on the first indication information includes: determining, by the terminal device, transport blocks associated with the same combination identifier as the at least two transport blocks; or determining, by the terminal device, transport blocks having the same combination identifier as the at least two transport blocks.

In a possible implementation, the terminal device receives downlink control information DCI, where the DCI includes the combination identifier, and the DCI is used to indicate the at least two transport blocks.

With reference to any one of the first aspect to the second possible implementation of the first aspect, in a third possible implementation of the first aspect, the at least two transport blocks include the first transport block and the second transport block, and the first transport block and the second transport block meet at least one of the following conditions: the first transport block and the second transport block are located in the first time period in time domain; the first transport block and the second transport block correspond to a same precoding matrix parameter or different precoding matrix parameters; the first transport block and the second transport block correspond to a same cell index or different cell indexes; the first transport block and the second transport block correspond to a same combination identifier; the first transport block is mapped to a first port number group, the second transport block is mapped to a second port number group, and a port number in the first port number group is different from a port number in the second port number group; the first transport block corresponds to a first reference signal group, the second transport block corresponds to a second reference signal group, and a port number in the first reference signal group is different from a port number in the second reference signal group; the first transport block is mapped to a first BWP, a second transport block is mapped to a second BWP, and indexes of the first BWP and the second BWP are different; and the first transport block is scrambled by using a first network identifier, the second transport block is scrambled by using a second network identifier, and the first network identifier and the second network identifier are different.

With reference to any one of the first aspect to the third possible implementation of the first aspect, in a fourth possible implementation of the first aspect, the determining, by a terminal device, at least two transport blocks includes: determining, by the terminal device, second indication information, where the second indication information is used to indicate parameter values of at least one parameter corresponding to the at least two transport blocks, and the at least one parameter includes one or more of the following parameters: a transport block size; an HARQ process number; a new data indicator NDI; an HARQ-ACK resource; a redundancy version RV; a time domain resource and/or a frequency domain resource; a start time of a first timer; and a combination identifier, where the combination identifier is used to indicate a transport block used for combined decoding; and determining, by the terminal device, the at least two transport blocks based on the second indication information. The terminal device determines the at least two transport blocks based on the second indication information, so that the terminal device can decode the first information in the at least two transport blocks when receiving the at least two transport blocks.

With reference to any one of the first aspect to the fourth possible implementation of the first aspect, in a fifth possible implementation of the first aspect, the at least two transport blocks include a first transport block and a second transport block; the second indication information indicates that a third parameter in the at least one parameter corresponds to a plurality of parameter values, and parameter values of the third parameter corresponding to the first transport block and the second transport block are different; and/or the second indication information indicates that a fourth parameter in the at least one parameter corresponds to one parameter value, and parameter values of the fourth parameter corresponding to the first transport block and the second transport block are the same.

With reference to any one of the first aspect to the fifth possible implementation of the first aspect, in a sixth possible implementation of the first aspect, the at least two transport blocks meet at least one of the following conditions: sizes of the at least two transport blocks are equal to the transport block size indicated by the second indication information; the at least two transport blocks are transport blocks received by the terminal device within the start time of the first timer indicated by the second indication information; the at least two transport blocks are transport blocks received by the terminal device at the HARQ process number indicated by the second indication information; the at least two transport blocks are transport blocks received by the terminal device on the time domain resource and/or the frequency domain resource indicated by the second indication information; the at least two transport blocks are transport blocks received by the terminal device at the new data indicator NDI indicated by the second indication information; the at least two transport blocks are transport blocks received by the terminal device on the HARQ-ACK resource indicated by the second indication information; and redundancy versions RVs corresponding to the at least two transport blocks are the redundancy version indicated by the second indication information. If at least two transport blocks in a plurality of transport blocks meet at least one of the foregoing conditions, the terminal device may determine that the first information carried in the at least two transport blocks is the same, so that the terminal device decodes the first information carried in the at least two transport blocks, or combines the first information carried in the at least two transport blocks and then decodes the first information.

With reference to any one of the first aspect to the sixth possible implementation of the first aspect, in a seventh possible implementation of the first aspect, the determining, by the terminal device, the at least two transport blocks based on the second indication information includes at least one of the following: determining, by the terminal device, the at least two transport blocks based on sizes of received transport blocks; determining, by the terminal device, transport blocks received within the start time of the first timer as the at least two transport blocks; determining, by the terminal device, the at least two transport blocks based on a time domain resource and/or a frequency domain resource corresponding to received transport blocks; determining, by the terminal device, the at least two transport blocks based on an HARQ process number corresponding to received transport blocks; determining, by the terminal device, the at least two transport blocks based on a new data indicator NDI corresponding to received transport blocks; determining, by the terminal device, the at least two transport blocks based on an HARQ-ACK resource corresponding to received transport blocks; or determining, by the terminal device, the at least two transport blocks based on a redundancy version RV corresponding to received transport blocks.

Optionally, the first indication information and the second indication information may be carried in same or different information, and are used together to indicate the at least two transport blocks.

With reference to any one of the first aspect to the seventh possible implementation of the first aspect, in an eighth possible implementation of the first aspect, the method provided in this application further includes: sending, by the terminal device, first feedback information, where the first feedback information is used to indicate that the terminal device correctly decodes or incorrectly decodes the first information in the at least two transport blocks. The terminal device sends the first feedback information. In this way, a receive end, for example, the network device or another terminal device, can determine whether the terminal device correctly decodes the first information, to determine whether to resend the first information or send other information different from the first information.

With reference to any one of the first aspect to the eighth possible implementation of the first aspect, in a ninth possible implementation of the first aspect, that the terminal device correctly decodes the first information transmitted by using the at least two transport blocks includes one of the following cases: the terminal device correctly decodes a transport block in the at least two transport blocks at least once; a quantity of times for which the terminal device correctly decodes a transport block in the at least two transport blocks is greater than or equal to a quantity of times for which the terminal device incorrectly decodes a transport block in the at least two transport blocks; and the terminal device performs combined decoding on a plurality of transport blocks in the at least two transport blocks, and correctly decodes the plurality of transport blocks at least once (which may be explained as that the terminal device performs combined decoding on a plurality of transport blocks in the at least two transport blocks, to obtain the first information). The first information is carried in the plurality of transport blocks. Therefore, the terminal device can determine that the first information is correctly decoded by determining that the terminal device correctly decodes the first information in the at least two transport blocks at least once, or the quantity of times of correct decoding is greater than or equal to the quantity of times of incorrect decoding, or by determining information obtained through correct combined decoding.

With reference to any one of the first aspect to the ninth possible implementation of the first aspect, in a tenth possible implementation of the first aspect, that the terminal device incorrectly decodes the first information in the at least two transport blocks includes any one of the following cases: the terminal device fails to correctly decode the first information in the at least two transport blocks; a quantity of times for which the terminal device correctly decodes the first information in the at least two transport blocks is less than a quantity of times for which the terminal device incorrectly decodes the first information in the at least two transport blocks; and the terminal device performs decoding on a plurality of transport blocks in the at least two transport blocks, and never correctly decodes the plurality of transport blocks. The terminal device receives the first information in the plurality of transport blocks. Therefore, the terminal device can determine that the first information is not correctly decoded by determining that the first information in the at least two transport blocks is not correctly decoded, or the quantity of times of correctly decoding the first information in the at least two transport blocks is less than the quantity of times of incorrectly decoding the first information in the at least two transport blocks, or information obtained by combining the first information in the at least two transport blocks is not correctly decoded.

With reference to any one of the first aspect to the tenth possible implementation of the first aspect, in an eleventh possible implementation of the first aspect, one of the at least two transport blocks is used for initial transmission, and another transport block except the transport block in the at least two transport blocks is used for retransmission; and the decoding first information transmitted by using the at least two transport blocks includes: separately decoding, by the terminal device, information in the transport block used for initial transmission; separately decoding, by the terminal device, information in the at least one transport block used for retransmission, to obtain the first information; and/or performing, by the terminal device, combined decoding on the transport block used for initial transmission and the at least one transport block used for retransmission in the at least two transport blocks, to obtain the first information. The transport block used for initial transmission and the transport block used for retransmission are determined, so that it is helpful for the terminal device to determine the information in the transport block used for initial transmission as initial transmission information, and subsequent packets can be sequentially combined. If performance of the information in the transport block used for initial transmission is higher than performance of the information in the transport block used for retransmission, the terminal device may perform combined decoding starting from the information with good performance to the information with poor performance, so that a quantity of times of combined decoding can be reduced, thereby saving power for the terminal device.

With reference to any one of the first aspect to the eleventh possible implementation of the first aspect, in a twelfth possible implementation of the first aspect, the determining, by the terminal device, at least two transport blocks used for retransmission; and the decoding, by the terminal device, first information transmitted by using the at least two transport blocks include: separately decoding, by the terminal device, the at least one transport block that is in the at least two transport blocks and that is used for retransmission, to obtain the first information; and/or performing, by the terminal device, combined decoding on a plurality of transport blocks that are in the at least two transport blocks and that are used for retransmission, to obtain the first information.

With reference to any one of the first aspect to the twelfth possible implementation of the first aspect, in a thirteenth possible implementation of the first aspect, the at least two transport blocks are used for initial transmission, and the decoding, by the terminal device, first information transmitted by using the at least two transport blocks includes: separately decoding, by the terminal device, at least one transport block that is in the at least two transport blocks and that is used for initial transmission, to obtain the first information; and/or performing, by the terminal device, combined decoding on a plurality of transport blocks that are in the at least two transport blocks and that are used for initial transmission, to obtain the first information.

With reference to any one of the first aspect to the thirteenth possible implementation of the first aspect, in a fourteenth possible implementation of the first aspect, time domain resources on which the at least two transport blocks are located partially or completely overlap.

With reference to any one of the first aspect to the fourteenth possible implementation of the first aspect, in a fifteenth possible implementation of the first aspect, the at least two transport blocks belong to a first transport block group, and the method provided in this application further includes: determining, by the terminal device, third indication information, where the third indication information is used to indicate a parameter value of at least one parameter corresponding to a second transport block group, and second information transmitted by using the second transport block group is different from the first information; and time domain resources on which the first transport block group and the second transport block group are located partially or completely overlap. Optionally, the method provided in this application further includes: decoding, by the terminal device, the first information transmitted by using the first transport block group, and decoding the second information transmitted by using a transport block in the second transport block group. There may be the second information in a process of receiving the first information by the terminal device. Therefore, the terminal device needs to decode information belonging to a same transport block group. In this way, the terminal device can correctly obtain information transmitted in each transport block group.

With reference to any one of the first aspect to the fifteenth possible implementation of the first aspect, in a sixteenth possible implementation of the first aspect, the method provided in this application further includes: receiving, by the terminal device, first configuration information, where the first configuration information is used to configure the terminal device to be capable of decoding a plurality of transport blocks, and determining, by the terminal device based on the first configuration information, that the terminal device can perform combined decoding, or perform combined decoding based on indication information. Alternatively, the terminal device determines, based on the first configuration information, not to perform combined decoding. Optionally, even if receiving the first and/or second indication information subsequently, the terminal device still does not perform combined decoding.

According to a second aspect, this application provides an information transmission method, including: generating, by a network device, first information, where the first information includes at least one of data and control information; and sending, by the network device, the first information to a terminal device by using at least two transport blocks. Each of the at least two transport blocks carries the first information. It should be noted herein that the first information is transmitted by using the at least two transport blocks in a duplicate transmission manner. In an optional manner, each transport block carries same complete first information. In another optional manner, the first information may be divided into a plurality of pieces of subinformation based on a size of information that can be carried in each transport block and/or a size of the first information. In this way, each transport block carries one or more pieces of subinformation, each transport block carries the first information, and the first information is sent by using the at least two transport blocks. For details, refer to related explanations of duplicate transmission in the embodiments.

With reference to the second aspect, in a first possible implementation of the second aspect, the method provided in this application further includes: receiving, by the network device, first feedback information sent by the terminal device, where the first feedback information is used to indicate that the terminal device correctly decodes or incorrectly decodes the first information in the at least two transport blocks.

The first feedback information includes at least two pieces of first sub-feedback information, the first sub-feedback information is used to indicate that the terminal device correctly decodes or incorrectly decodes the first information in one of the at least two transport blocks, and that the first feedback information is used to indicate that the terminal device correctly decodes the first information in the at least two transport blocks includes at least one of the following cases: the first feedback information includes at least one piece of first sub-feedback information, and the first sub-feedback information indicates that the terminal device correctly decodes a transport block in the at least two transport blocks; and a quantity of pieces of first sub-feedback information that is included in the first feedback information and that indicates that the terminal device correctly decodes a transport block in the at least two transport blocks is greater than or equal to a quantity of pieces of first sub-feedback information that is included in the first feedback information and that indicates that the terminal device incorrectly decodes a transport block in the at least two transport blocks. The first feedback information includes at least two pieces of first sub-feedback information, the first sub-feedback information is used to indicate that the terminal device correctly decodes or incorrectly decodes the first information in one of the at least two transport blocks, and that the first feedback information is used to indicate that the terminal device incorrectly decodes the first information in the at least two transport blocks includes at least one of the following cases: all the first sub-feedback information included in the first feedback information indicates that the terminal device incorrectly decodes a transport block in the at least two transport blocks; and a quantity of pieces of first sub-feedback information that is included in the first feedback information and that indicates that the terminal device correctly decodes a transport block in the at least two transport blocks is less than or equal to a quantity of pieces of first sub-feedback information that is included in the first feedback information and that indicates that the terminal device incorrectly decodes a transport block in the at least two transport blocks.

Optionally, the method provided in this application further includes: determining, by the network device based on the first feedback information, that the terminal device correctly decodes the first information transmitted by using the at least two transport blocks, or incorrectly decodes the first information transmitted by using the at least two transport blocks.

With reference to the second aspect or the first possible implementation of the second aspect, in a second possible implementation of the second aspect, the determining, by the terminal device based on the first feedback information, that the terminal device correctly decodes the first information transmitted by using the at least two transport blocks includes at least one of the following cases: if the network device determines that the terminal device correctly decodes a transport block in the at least two transport blocks at least once, determining, by the network device, that the terminal device correctly decodes the first information transmitted by using the at least two transport blocks; if the network device determines that a quantity of times for which the terminal device correctly decodes a transport block in the at least two transport blocks is greater than or equal to a quantity of times for which the terminal device incorrectly decodes a transport block in the at least two transport blocks, determining, by the network device, that the terminal device correctly decodes the first information transmitted by using the at least two transport blocks; and if the network device determines that the terminal device performs combined decoding on a plurality of transport blocks in the at least two transport blocks, and obtains the first information, determining, by the network device, that the terminal device incorrectly decodes the first information transmitted by using the at least two transport blocks.

With reference to any one of the second aspect to the second possible implementation of the second aspect, in a third possible implementation of the second aspect, the determining, by the terminal device based on the first feedback information, that the terminal device incorrectly decodes the first information transmitted by using the at least two transport blocks includes at least one of the following cases: determining, by the network device, that the terminal device correctly decodes none of the at least two transport blocks, and determining, by the network device, that the terminal device incorrectly decodes the first information transmitted by using the at least two transport blocks; determining, by the network device, that a quantity of times for which the terminal device correctly decodes a transport block in the at least two transport blocks is less than a quantity of times for which the terminal device incorrectly decodes a transport block in the at least two transport blocks, and determining, by the network device, that the terminal device incorrectly decodes the first information transmitted by using the at least two transport blocks; and determining, by the network device, that the terminal device performs combined decoding on a plurality of transport blocks in the at least two transport blocks, but fails to obtain the first information, and determining, by the network device, that the terminal device incorrectly decodes the first information transmitted by using the at least two transport blocks.

With reference to any one of the second aspect to the third possible implementation of the second aspect, in a fourth possible implementation of the second aspect, the method provided in this application further includes: sending, by the network device, first configuration information to the terminal device, where the first configuration information is used to configure the terminal device to be capable of performing combined decoding on a plurality of transport blocks.

With reference to any one of the second aspect to the fourth possible implementation of the second aspect, in a fifth possible implementation of the second aspect, the at least two transport blocks belong to a first transport block group, and the method provided in this application further includes: sending, by the network device, third indication information to the terminal device, where the third indication information is used to indicate a parameter value of at least one parameter corresponding to a second transport block group, and second information transmitted by using the second transport block group is different from the first information; and time domain resources on which the first transport block group and the second transport block group are located partially or completely overlap.

With reference to any one of the second aspect to the fifth possible implementation of the second aspect, in a sixth possible implementation of the second aspect, the network device sends first indication information to the terminal device, where the first indication information is used to indicate parameter values of at least one parameter corresponding to the at least two transport blocks, and the at least one parameter includes one or more of the following parameters: a first time period; a bandwidth part BWP; a precoding matrix parameter; a network identifier; a reference signal; a cell index; and a combination identifier, where the combination identifier is used to indicate a transport block used for combined decoding.

With reference to any one of the second aspect to the sixth possible implementation of the second aspect, in a seventh possible implementation of the second aspect, the at least two transport blocks include a first transport block and a second transport block; the first indication information indicates that a first parameter in the at least one parameter corresponds to a plurality of parameter values, and parameter values of the first parameter corresponding to the first transport block and the second transport block are different; and/or the first indication information indicates that a second parameter in the at least one parameter corresponds to one parameter value, and parameter values of the second parameter corresponding to the first transport block and the second transport block are the same.

With reference to any one of the second aspect to the seventh possible implementation of the second aspect, in an eighth possible implementation of the second aspect, the at least two transport blocks include the first transport block and the second transport block, and the first transport block and the second transport block meet at least one of the following conditions: the first transport block and the second transport block are mapped to different port number groups, and port numbers included in the different port number groups are different; the first transport block and the second transport block respectively correspond to different reference signal groups, and reference signals included in the different reference signal groups are different; the first transport block and the second transport block are mapped to different BWPs, and indexes of the different BWPs are different; and the first transport block and the second transport block are scrambled by using different network identifiers.

With reference to any one of the second aspect to the eighth possible implementation of the second aspect, in a ninth possible implementation of the second aspect, the method provided in this application further includes: sending, by the network device, second indication information to the terminal device, where the second indication information is used to indicate parameter values of at least one parameter corresponding to the at least two transport blocks, and the at least one parameter includes one or more of the following parameters: a transport block size; an HARQ process number; a new data indicator NDI; an HARQ-ACK ACK resource; a redundancy version RV; a time domain resource and/or a frequency domain resource; a start time of a first timer; and a combination identifier, where the combination identifier is used to indicate a transport block used for combined decoding.

With reference to any one of the second aspect to the ninth possible implementation of the second aspect, in a tenth possible implementation of the second aspect, the at least two transport blocks include a first transport block and a second transport block; the second indication information indicates that a third parameter in the at least one parameter corresponds to a plurality of parameter values, and parameter values of the third parameter corresponding to the first transport block and the second transport block are different; and/or the second indication information indicates that a fourth parameter in the at least one parameter corresponds to one parameter value, and parameter values of the fourth parameter corresponding to the first transport block and the second transport block are the same.

With reference to any one of the second aspect to the tenth possible implementation of the second aspect, in an eleventh possible implementation of the second aspect, the at least two transport blocks meet at least one of the following conditions: sizes of the at least two transport blocks are equal to the transport block size indicated by the second indication information; the at least two transport blocks are transport blocks received by the terminal device within the start time of the first timer indicated by the second indication information; the at least two transport blocks are transport blocks received by the terminal device at the HARQ process number indicated by the second indication information; the at least two transport blocks are transport blocks received by the terminal device on the time domain resource and/or the frequency domain resource indicated by the second indication information; the at least two transport blocks are transport blocks received by the terminal device at the new data indicator NDI indicated by the second indication information; the at least two transport blocks are transport blocks received by the terminal device on the HARQ-ACK resource indicated by the second indication information; and redundancy versions RVs corresponding to the at least two transport blocks are the redundancy version indicated by the second indication information.

Correspondingly, according to a third aspect, this application provides a wireless apparatus. The wireless apparatus may be an information transmission apparatus. The information transmission apparatus may implement the information transmission method described in any one of the first aspect to the sixteenth possible implementation of the first aspect. For example, the information transmission apparatus may be a terminal device, or a chip disposed in a terminal device. The information transmission apparatus may implement the foregoing methods by using software, hardware, or hardware executing corresponding software.

The information transmission apparatus includes a determining unit, configured to determine at least two transport blocks; and a decoding unit, configured to decode first information transmitted by using the at least two transport blocks, where the first information includes at least one of control information and data, where the decoding unit is specifically configured to perform at least one of the following operations to decode the first information transmitted by using the at least two transport blocks: decoding at least one transport block in the at least two transport blocks, to obtain the first information; or performing combined decoding on a plurality of transport blocks in the at least two transport blocks, to obtain the first information.

With reference to the third aspect, in a first possible implementation of the third aspect, the determining unit is configured to determine first indication information, where the first indication information is used to indicate parameter values of at least one parameter corresponding to the at least two transport blocks, and the at least one parameter includes one or more of the following parameters: a first time period; a bandwidth part BWP; a precoding matrix parameter; a network identifier; a reference signal; a cell index; and a combination identifier, where the combination identifier is used to indicate a transport block used for combined decoding; the terminal device determines the at least two transport blocks based on the first indication information; and the determining unit is specifically configured to determine the at least two transport blocks based on the first indication information.

With reference to the third aspect or the first possible implementation of the third aspect, in a second possible implementation of the third aspect, the at least two transport blocks include a first transport block and a second transport block; the first indication information indicates that a first parameter in the at least one parameter corresponds to a plurality of parameter values, and parameter values of the first parameter corresponding to the first transport block and the second transport block are different; and/or the first indication information indicates that a second parameter in the at least one parameter corresponds to one parameter value, and parameter values of the second parameter corresponding to the first transport block and the second transport block are the same.

In a possible implementation, the first indication information is used to indicate a combination identifier corresponding to the at least two transport blocks. The determining unit is specifically configured to determine transport blocks associated with the same combination identifier as the at least two transport blocks, or the determining unit is specifically configured to determine transport blocks having the same combination identifier as the at least two transport blocks.

In a possible implementation, the information transmission apparatus further includes a receiving unit, configured to receive downlink control information DCI, where the DCI includes the combination identifier, and the DCI is used to indicate the at least two transport blocks.

With reference to any one of the third aspect to the second possible implementation of the third aspect, in a third possible implementation of the third aspect, the at least two transport blocks include the first transport block and the second transport block; based on the first indication information, the first transport block and the second transport block meet at least one of the following conditions: the first transport block is mapped to a first port number group, the second transport block is mapped to a second port number group, and a port number in the first port number group is different from a port number in the second port number group; the first transport block corresponds to a first reference signal group, the second transport block corresponds to a second reference signal group, and a port number in the first reference signal group is different from a port number in the second reference signal group; a first transport block is mapped to a first BWP, a second transport block is mapped to a second BWP, and indexes of the first BWP and the second BWP are different; and the first transport block is scrambled by using a first network identifier, the second transport block is scrambled by using a second network identifier, and the first network identifier and the second network identifier are different.

With reference to any one of the third aspect to the third possible implementation of the third aspect, in a fourth possible implementation of the third aspect, the determining unit is further configured to determine second indication information, where the second indication information is used to indicate parameter values of at least one parameter corresponding to the at least two transport blocks, and the at least one parameter includes one or more of the following parameters: a transport block size; an HARQ process number; a new data indicator NDI; an HARQ-ACK resource; a redundancy version RV; a time domain resource and/or a frequency domain resource; a start time of a first timer; and a combination identifier, where the combination identifier is used to indicate a transport block used for combined decoding; and the determining unit is further configured to determine the at least two transport blocks based on the second indication information.

With reference to any one of the third aspect to the fourth possible implementation of the third aspect, in a fifth possible implementation of the first aspect, the at least two transport blocks include a first transport block and a second transport block; the second indication information indicates that a third parameter in the at least one parameter corresponds to a plurality of parameter values, and parameter values of the third parameter corresponding to the first transport block and the second transport block are different; and/or the second indication information indicates that a fourth parameter in the at least one parameter corresponds to one parameter value, and parameter values of the fourth parameter corresponding to the first transport block and the second transport block are the same.

With reference to any one of the third aspect to the fifth possible implementation of the third aspect, in a sixth possible implementation of the first aspect, based on the second indication information, the at least two transport blocks meet at least one of the following conditions: sizes of the at least two transport blocks are equal to the transport block size indicated by the second indication information; the at least two transport blocks are transport blocks received by the terminal device within the start time of the first timer indicated by the second indication information; the at least two transport blocks are transport blocks received by the terminal device at the HARQ process number indicated by the second indication information; the at least two transport blocks are transport blocks received by the terminal device on the time domain resource and/or the frequency domain resource indicated by the second indication information; the at least two transport blocks are transport blocks received by the terminal device at the new data indicator NDI indicated by the second indication information; the at least two transport blocks are transport blocks received by the terminal device on the HARQ-ACK resource indicated by the second indication information; and redundancy versions RVs corresponding to the at least two transport blocks are the redundancy version indicated by the second indication information.

With reference to any one of the third aspect to the sixth possible implementation of the third aspect, in a seventh possible implementation of the first aspect, the determining unit is further specifically configured to perform at least one of the following operations: determining the at least two transport blocks based on sizes of received transport blocks; determining transport blocks received within the start time of the first timer as the at least two transport blocks; determining the at least two transport blocks based on a time domain resource and/or a frequency domain resource corresponding to received transport blocks; determining the at least two transport blocks based on an HARQ process number corresponding to received transport blocks; determining, by the terminal device, the at least two transport blocks based on a new data indicator NDI corresponding to received transport blocks; determining the at least two transport blocks based on an HARQ-ACK resource corresponding to received transport blocks; or determining the at least two transport blocks based on a redundancy version RV corresponding to received transport blocks.

With reference to any one of the third aspect to the seventh possible implementation of the third aspect, in an eighth possible implementation of the third aspect, the apparatus provided in this application further includes: a sending unit, configured to send first feedback information, where the first feedback information is used to indicate that the terminal device correctly decodes or incorrectly decodes the first information transmitted by using the at least two transport blocks.

With reference to any one of the third aspect to the eighth possible implementation of the third aspect, in a ninth possible implementation of the third aspect, the determining unit is further configured to perform at least one of the following operations to determine that the terminal device correctly decodes the first information transmitted by using the at least two transport blocks: determining that a transport block in the at least two transport blocks is correctly decoded at least once; determining that a quantity of times of correctly decoding a transport block in the at least two transport blocks is greater than or equal to a quantity of times of incorrectly decoding a transport block in the at least two transport blocks; and determining that combined decoding is performed on a plurality of transport blocks in the at least two transport blocks, and the plurality of transport blocks are correctly decoded at least once.

With reference to any one of the third aspect to the ninth possible implementation of the first aspect, in a tenth possible implementation of the first aspect, the determining unit is further configured to perform at least one of the following operations to determine that the terminal device incorrectly decodes the first information transmitted by using the at least two transport blocks: determining that none of the at least two transport blocks is correctly decoded; determining that a quantity of times of correctly decoding a transport block in the at least two transport blocks is less than a quantity of times of incorrectly decoding a transport block in the at least two transport blocks; and determining that combined decoding is performed on a plurality of transport blocks in the at least two transport blocks, but none of the plurality of transport blocks is correctly decoded.

With reference to any one of the third aspect to the tenth possible implementation of the third aspect, in an eleventh possible implementation of the third aspect, one of the at least two transport blocks is used for initial transmission, and another transport block except the transport block in the at least two transport blocks is used for retransmission; the decoding unit is specifically configured to: separately decode the transport block used for initial transmission; and separately decode the at least one transport block used for retransmission, to obtain the first information; and/or the decoding unit is specifically configured to perform combined decoding on the transport block used for initial transmission and the at least one transport block used for retransmission, to obtain the first information.

With reference to any one of the third aspect to the eleventh possible implementation of the third aspect, in a twelfth possible implementation of the third aspect, the at least two transport blocks are used for retransmission, and the decoding unit is specifically configured to separately decode the at least one transport block that is in the at least two transport blocks and that is used for retransmission, to obtain the first information; and/or the decoding unit is specifically configured to perform combined decoding on a plurality of transport blocks that are in the at least two transport blocks and that are used for retransmission, to obtain the first information.

With reference to any one of the third aspect to the twelfth possible implementation of the third aspect, in a thirteenth possible implementation of the third aspect, the at least two transport blocks are transport blocks used for initial transmission, and the decoding unit is specifically configured to separately decode the at least one transport block that is in the at least two transport blocks and that is used for initial transmission, to obtain the first information; and/or the decoding unit is specifically configured to perform combined decoding on a plurality of transport blocks that are in the at least two transport blocks and that are used for initial transmission, to obtain the first information.

With reference to any one of the third aspect to the thirteenth possible implementation of the third aspect, in a fourteenth possible implementation of the third aspect, time domain resources on which the at least two transport blocks are located partially or completely overlap.

With reference to any one of the third aspect to the fourteenth possible implementation of the third aspect, in a fifteenth possible implementation of the third aspect, the at least two transport blocks belong to a first transport block group, and the determining unit is further configured to determine third indication information, where the third indication information is used to indicate a parameter value of at least one parameter corresponding to a second transport block group, and second information transmitted by using the second transport block group is different from the first information transmitted by using the first transport block group; and time domain resources on which the first transport block group and the second transport block group are located partially or completely overlap. Optionally, the decoding unit in this application is specifically configured to decode the first information transmitted by using a transport block in the first transport block group, and decode the second information transmitted by using a transport block in the second transport block group.

With reference to any one of the third aspect to the fifteenth possible implementation of the third aspect, in a sixteenth possible implementation of the third aspect, the apparatus provided in this application further includes: a receiving unit, configured to receive first configuration information, where the first configuration information is used to configure the terminal device to be capable of performing combined decoding on a plurality of transport blocks.

In addition, this application further provides a wireless apparatus. The wireless apparatus includes a processor. The processor is configured to: determine at least two transport blocks, and decode first information transmitted by using the at least two transport blocks.

Optionally, the wireless apparatus includes a receiver, configured to receive the at least two transport blocks. The receiver is configured to support the wireless apparatus in performing the related operation of receiving information/data at the wireless apparatus side described in any one of the first aspect and the possible implementations of the first aspect.

Optionally, the wireless apparatus further includes a transmitter. The transmitter is configured to support the wireless apparatus in implementing the related operation of sending information/data at the wireless apparatus side described in any one of the first aspect and the possible implementations of the first aspect. The processor is further configured to perform the operation of processing information/data at the wireless apparatus side described in any one of the first aspect and the possible implementations of the first aspect. Optionally, the wireless apparatus in this application further includes a bus and a memory. The memory is configured to store code and data. The processor, the receiver, the transmitter, and the memory are connected by using the bus.

According to a fourth aspect, in a possible design, the information transmission apparatus may be a terminal device or a chip disposed in a terminal device, and the information transmission apparatus may include at least one processor. The at least one processor is configured to execute an instruction to support the information transmission apparatus in performing the related operation of processing or controlling a message at the information transmission apparatus side in the method described in any one of the first aspect to the sixteenth possible implementation of the first aspect. Optionally, the apparatus may further include a memory, configured to be coupled to at least one processor, and the memory stores a program and data that are necessary for the apparatus. In addition, optionally, the information transmission apparatus may further include a communications interface, configured to support communication between the information transmission apparatus and another network element (for example, a network device). The communications interface may be a transceiver circuit. The transceiver circuit is configured to support the information transmission apparatus in performing the related operation of receiving and sending a message at the information transmission apparatus side in the method described in any one of the first aspect to the sixteenth possible implementation of the first aspect. Optionally, the information transmission apparatus may further include a bus. The memory, the communications interface, and the at least one processor may be interconnected by using the bus.

Correspondingly, according to a fifth aspect, this application provides an information transmission apparatus. The information transmission apparatus may implement the information transmission method described in any one of the second aspect to the eleventh possible implementation of the second aspect. For example, the information transmission apparatus may be a network device, or a chip disposed in a network device. The information transmission apparatus may implement the foregoing methods by using software, hardware, or hardware executing corresponding software.

The information transmission apparatus includes: a generation unit, configured to generate first information, where the first information includes at least one of data and control information; and a sending unit, configured to send the first information to a terminal device by using at least two transport blocks.

With reference to the fifth aspect, in a first possible implementation of the fifth aspect, the apparatus provided in this application further includes: a receiving unit, configured to receive first feedback information sent by the terminal device, where the first feedback information is used to indicate that the terminal device correctly decodes or incorrectly decodes the first information in the at least two transport blocks. Optionally, the determining unit provided in this application is further configured to determine, based on the first feedback information, that the terminal device correctly decodes the first information transmitted by using the at least two transport blocks, or the terminal device incorrectly decodes the first information transmitted by using the at least two transport blocks.

The first feedback information includes at least two pieces of first sub-feedback information, the first sub-feedback information is used to indicate that the terminal device correctly decodes or incorrectly decodes the first information in one of the at least two transport blocks, and that the first feedback information is used to indicate that the terminal device correctly decodes the first information in the at least two transport blocks includes at least one of the following cases: the first feedback information includes at least one piece of first sub-feedback information, and the first sub-feedback information indicates that the terminal device correctly decodes a transport block in the at least two transport blocks; and a quantity of pieces of first sub-feedback information that is included in the first feedback information and that indicates that the terminal device correctly decodes a transport block in the at least two transport blocks is greater than or equal to a quantity of pieces of first sub-feedback information that is included in the first feedback information and that indicates that the terminal device incorrectly decodes a transport block in the at least two transport blocks. The first feedback information includes at least two pieces of first sub-feedback information, the first sub-feedback information is used to indicate that the terminal device correctly decodes or incorrectly decodes the first information in one of the at least two transport blocks, and that the first feedback information is used to indicate that the terminal device incorrectly decodes the first information in the at least two transport blocks includes at least one of the following cases: all the first sub-feedback information included in the first feedback information indicates that the terminal device incorrectly decodes a transport block in the at least two transport blocks; and a quantity of pieces of first sub-feedback information that is included in the first feedback information and that indicates that the terminal device correctly decodes a transport block in the at least two transport blocks is less than or equal to a quantity of pieces of first sub-feedback information that is included in the first feedback information and that indicates that the terminal device incorrectly decodes a transport block in the at least two transport blocks.

With reference to the fifth aspect or the first possible implementation of the fifth aspect, in a second possible implementation of the fifth aspect, the determining unit is specifically configured to perform any one of the following operations to determine the first information transmitted by the terminal device by using the at least two transport blocks: determining that the terminal device correctly decodes a transport block in the at least two transport blocks at least once; determining that a quantity of times for which the terminal device correctly decodes a transport block in the at least two transport blocks is greater than or equal to a quantity of times for which the terminal device incorrectly decodes a transport block in the at least two transport blocks; and determining that the terminal device performs combined decoding on a plurality of transport blocks in the at least two transport blocks, and correctly decodes the plurality of transport blocks at least once.

With reference to any one of the fifth aspect to the second possible implementation of the fifth aspect, in a third possible implementation of the fifth aspect, the determining unit is further configured to perform any one of the following operations to determine that the terminal device incorrectly decodes the first information transmitted by using the at least two transport blocks: determining that the terminal device correctly decodes none of the at least two transport blocks; determining that a quantity of times for which the terminal device correctly decodes a transport block in the at least two transport blocks is less than a quantity of times for which the terminal device incorrectly decodes a transport block in the at least two transport blocks; and determining that the terminal device performs combined decoding on a plurality of transport blocks in the at least two transport blocks, but never correctly decodes the plurality of transport blocks.

With reference to any one of the fifth aspect to the third possible implementation of the fifth aspect, in a fourth possible implementation of the fifth aspect, the sending unit is further configured to send first configuration information to the terminal device, where the first configuration information is used to configure the terminal device to be capable of performing combined decoding on a plurality of transport blocks.

With reference to any one of the fifth aspect to the fourth possible implementation of the fifth aspect, in a fifth possible implementation of the fifth aspect, the at least two transport blocks belong to a first transport block group, and the sending unit is further configured to send third indication information to the terminal device, where the third indication information is used to indicate a parameter value of at least one parameter corresponding to a second transport block group, and second information transmitted by using the second transport block group is different from the first information; and time domain resources on which the first transport block group and the second transport block group are located partially or completely overlap.

With reference to any one of the fifth aspect to the fifth possible implementation of the fifth aspect, in a sixth possible implementation of the fifth aspect, the sending unit is specifically configured to send first indication information to the terminal device, where the first indication information is used to indicate parameter values of at least one parameter corresponding to the at least two transport blocks, and the at least one parameter includes one or more of the following parameters: a first time period; a bandwidth part BWP; a precoding matrix parameter; a network identifier; a reference signal; a cell index; and a combination identifier, where the combination identifier is used to indicate a transport block used for combined decoding.

With reference to any one of the fifth aspect to the sixth possible implementation of the fifth aspect, in a seventh possible implementation of the fifth aspect, the at least two transport blocks include a first transport block and a second transport block; the first indication information indicates that a first parameter in the at least one parameter corresponds to a plurality of parameter values, and parameter values of the first parameter corresponding to the first transport block and the second transport block are different; and/or the first indication information indicates that a second parameter in the at least one parameter corresponds to one parameter value, and parameter values of the second parameter corresponding to the first transport block and the second transport block are the same.

With reference to any one of the fifth aspect to the seventh possible implementation of the fifth aspect, in an eighth possible implementation of the fifth aspect, the at least two transport blocks include the first transport block and the second transport block, and the first transport block and the second transport block meet at least one of the following conditions: the first transport block and the second transport block are mapped to different port number groups, and port numbers included in the different port number groups are different; the first transport block and the second transport block respectively correspond to different reference signal groups, and reference signals included in the different reference signal groups are different; the first transport block and the second transport block are mapped to different BWPs, and indexes of the different BWPs are different; and the first transport block and the second transport block are scrambled by using different network identifiers.

With reference to any one of the fifth aspect to the eighth possible implementation of the fifth aspect, in a ninth possible implementation of the fifth aspect, the sending unit is specifically configured to send second indication information to the terminal device, where the second indication information is used to indicate parameter values of at least one parameter corresponding to the at least two transport blocks, and the at least one parameter includes one or more of the following parameters: a transport block size; an HARQ process number; a new data indicator NDI; an HARQ-ACK ACK resource; a redundancy version RV; a time domain resource and/or a frequency domain resource; a start time of a first timer; and a combination identifier, where the combination identifier is used to indicate a transport block used for combined decoding.

With reference to any one of the fifth aspect to the ninth possible implementation of the fifth aspect, in a tenth possible implementation of the fifth aspect, the at least two transport blocks include a first transport block and a second transport block; the second indication information indicates that a third parameter in the at least one parameter corresponds to a plurality of parameter values, and parameter values of the third parameter corresponding to the first transport block and the second transport block are different; and/or the second indication information indicates that a fourth parameter in the at least one parameter corresponds to one parameter value, and parameter values of the fourth parameter corresponding to the first transport block and the second transport block are the same.

With reference to any one of the fifth aspect to the tenth possible implementation of the fifth aspect, in an eleventh possible implementation of the fifth aspect, the at least two transport blocks meet at least one of the following conditions: sizes of the at least two transport blocks are equal to the transport block size indicated by the second indication information; the at least two transport blocks are transport blocks received by the terminal device within the start time of the first timer indicated by the second indication information; the at least two transport blocks are transport blocks received by the terminal device at the HARQ process number indicated by the second indication information; the at least two transport blocks are transport blocks received by the terminal device on the time domain resource and/or the frequency domain resource indicated by the second indication information; the at least two transport blocks are transport blocks received by the terminal device at the new data indicator NDI indicated by the second indication information; the at least two transport blocks are transport blocks received by the terminal device on the HARQ-ACK resource indicated by the second indication information; and redundancy versions RVs corresponding to the at least two transport blocks are the redundancy version indicated by the second indication information.

In addition, this application further provides a wireless apparatus. The wireless apparatus includes a processor and a transmitter. The processor is configured to generate first information, and the transmitter is configured to send the first information by using at least two transport blocks.

Optionally, the wireless apparatus further includes a receiver. The transmitter is configured to support the wireless apparatus in implementing the related operation of sending information/data at the wireless apparatus side described in any one of the second aspect and the possible implementations of the second aspect. The receiver is further configured to support the wireless apparatus in implementing the related operation of receiving information/data at the wireless apparatus side described in any one of the second aspect and the possible implementations of the second aspect. The processor is further configured to perform the operation of processing information/data at the wireless apparatus side described in any one of the second aspect and the possible implementations of the second aspect. Optionally, the wireless apparatus in this application further includes a bus and a memory. The memory is configured to store code and data. The processor, the receiver, the transmitter, and the memory are connected by using the bus.

According to the sixth aspect, in a possible design, the information transmission apparatus may be a network device or a chip disposed in a network device, and the information transmission apparatus may include at least one processor. The at least one processor is configured to execute an instruction to support the information transmission apparatus in performing the related operation of processing or controlling a message at the information transmission apparatus side in the method described in any one of the second aspect to the eleventh possible implementation of the second aspect. Optionally, the apparatus may further include a memory, configured to be coupled to at least one processor, and the memory stores a program (instruction) and data that are necessary for the apparatus. In addition, optionally, the information transmission apparatus may further include a communications interface, configured to support communication between the information transmission apparatus and another network element (for example, a terminal device). The communications interface may be a transceiver circuit. The transceiver circuit is configured to support the information transmission apparatus in performing the related operation of receiving and sending a message at the information transmission apparatus side in the method described in any one of the second aspect to the eleventh possible implementation of the second aspect. Optionally, the information transmission apparatus may further include a bus. The memory, the communications interface, and the at least one processor may be interconnected by using the bus.

This application provides an information transmission system, including at least one of the terminal devices described in any one of the third aspect and the network device described in any one of the fifth aspect.

According to a seventh aspect, this application provides a computer-readable storage medium. The computer-readable storage medium stores an instruction. When the instruction is run, the information transmission method described in the first aspect to the sixteenth possible implementation of the first aspect is performed.

According to an eighth aspect, this application provides a computer-readable storage medium. The computer-readable storage medium stores an instruction. When the instruction is executed, the information transmission method described in the second aspect to the eleventh possible implementation of the second aspect is performed.

According to a ninth aspect, this application provides a computer program product including an instruction. The computer program product stores the instruction. When the instruction is run, a terminal device is enabled to perform the information transmission method described in any one of the first aspect to the sixteenth possible implementation of the first aspect.

According to a tenth aspect, this application provides a computer program product including an instruction. The computer program product stores the instruction. When the instruction is run, a network device is enabled to perform the information transmission method described in any one of the second aspect to the eleventh possible implementation of the second aspect.

According to an eleventh aspect, this application provides a chip system, applied to an information transmission apparatus. The chip system includes at least one processor and an interface circuit. The interface circuit and the at least one processor are interconnected by using a line. The processor is configured to run an instruction, to perform the information transmission method described in any one of the first aspect to the sixteenth possible implementation of the first aspect.

According to a twelfth aspect, this application provides a chip system, applied to an information transmission apparatus. The chip system includes at least one processor and an interface circuit. The interface circuit and the at least one processor are interconnected by using a line. The processor is configured to run an instruction, to perform the information transmission method described in any one of the second aspect to the eleventh possible implementation of the second aspect.

Optionally, the chip system described above in this application further includes at least one memory, and the at least one memory stores an instruction.

DETAILED DESCRIPTION OF ILLUSTRATIVE EMBODIMENTS

Figure 1:
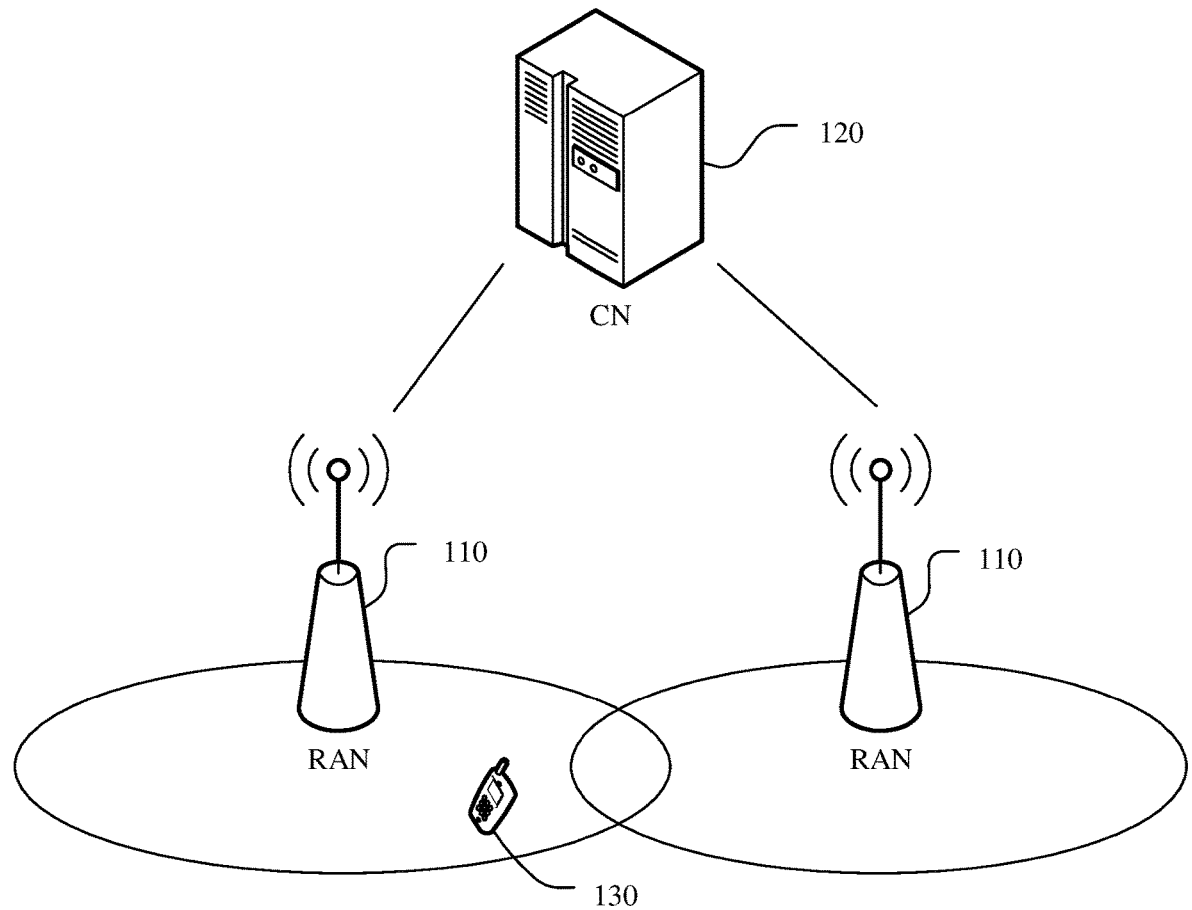
FIG. 1 shows an architecture of a communications system to which an information transmission method according to this application is applied.

This application provides an information transmission method and apparatus, to meet a relatively high reliability requirement, and achieve a relatively low error rate, for example, $10e^{-4}$, $10e^{-5}$, and $10e^{-6}$, and a relatively low transmission latency for a service in a communications system. In the prior art, a combined decoding mechanism is usually used for data transmitted on a channel, and the combined decoding mechanism generally includes chase combining (CC) or incremental redundancy (IR). The chase combining (CC) may be understood as: In a pure HARQ mechanism, received incorrect data packets are directly discarded. Although these incorrect packets cannot be decoded correctly independently, the incorrect packets still contain specific information. The chase combining (CC) is to use this part of information, that is, store the received incorrect data packets in a memory, and combine the incorrect data packets with a retransmitted data packet for decoding, thereby improving transmission efficiency. The incremental redundancy may be understood as: An information bit and some redundant bits are sent during first transmission, and an additional redundant bit is sent through retransmission. If the information bit and the redundant bits in the first transmission are not successfully decoded, more redundant bits may be retransmitted. In this case, a channel coding rate is reduced, and a decoding success rate is improved. If normal decoding still fails after the retransmitted redundant bits are used, retransmission is performed again. As a quantity of times of retransmission increases, the redundant bits accumulate and the channel coding rate continuously decreases. In this case, a better decoding effect can be achieved. However, in this application, a network device transmits first information to a terminal device by using a plurality of transport blocks. In this way, after receiving the first information transmitted by using the plurality of transport blocks, the terminal device may combine, through HARQ combination, information carried in the plurality of transport blocks, to determine the first information. "Combination" in this application may be chase combining, or may be incremental redundancy combination, or may be another manner. This is not limited in this application. The method and apparatus are based on a same inventive concept. Because a problem-resolving principle of the method is similar to that of the device, mutual reference may be made to implementations of the method and the device, and repeated description is not provided.

It should be noted that, in this application, the word "for example" or "example" is used to represent giving an example, an illustration, or a description. Any embodiment or design scheme described as "for example" or "example" in this application should not be explained as being more preferred or having more advantages over another embodiment or design scheme. Exactly, use of the word "for example", "example", or the like is intended to present a related concept in a specific manner.

In this application, "of", "corresponding", and "relevant" may be interchangeably used sometimes. It should be pointed out that, consistent meanings are expressed when differences are not emphasized.

The term "a plurality of" in this application means two or more.

In this application, the terms "first", "second", and the like are merely used to distinguish between different objects, but not limit a sequence thereof. For example, a first transport block and a second transport block are merely used to distinguish between different transport blocks, rather than limit a sequence of the first transport block and the second transport block.

Before this application is described, related terms used in this application are first described.

Duplication: Duplication generally involves repetition or duplication of a transport block or information in a transport block. For example, a plurality of transport blocks (TB) are combined, some or all information in a plurality of TBs is the same. Sending in a duplicate manner may be understood as transmitting same information in a plurality of transport blocks or information in a plurality of transport blocks. Therefore, a receive end can perform combined decoding or decoding, and send, in the duplicate manner, same first information transmitted by using a plurality of transport blocks. There are a plurality of implementations for duplication. For example, a plurality of transport blocks separately duplicate all information of a transmitted transport block, a plurality of transport blocks separately duplicate partial information of a transmitted transport block, or a plurality of transport blocks generate, based on a same data source, first information in different specific forms, for example, first information with different redundancy versions.

Combination or combination: Combination generally involves combination of transport blocks or information in transport blocks, for example, combination of a plurality of transport blocks (TB), or combination of some or all information in a plurality of TBs. Combined decoding may be understood as combined decoding or decoding based on a plurality of transport blocks or information in a plurality of transport blocks, to obtain the first information transmitted by using the plurality of transport blocks. There may be a plurality of implementations for combination. For example, information that is transmitted by using a plurality of transport blocks and that uses different redundancy versions is combined, or some or all information transmitted by using a plurality of transport blocks is combined, or a plurality of transport blocks are directly combined. A specific combination manner may be CC or IR. This is not limited in the present invention.

Further, combined decoding generally refers to a mechanism in which the receive end combines initially transmitted information and information retransmitted at least once or combines a plurality of pieces of retransmitted information to decode target information, and the combined decoding may also be referred to as combined decoding. In this application, the combined decoding may be explained in an extended manner as that information transmitted for a plurality of times, for example, information carried in a plurality of transport blocks, is combined for combined decoding or combined decoding. Because a performance gain may be brought by the combined decoding at the receive end, a transmit end corresponding to the receive end needs to perform duplicate transmission. That is, the transmit end adds same information or information from a same information source to different transport blocks for sending. It may be understood that, when the transmit end is the terminal device and the receive end is the network device, duplicate transmission behavior of the terminal device needs to be indicated by the network device. In other words, the terminal device needs to determine, based on indication information, transport blocks used for duplicate transmission of the first information. When the transmit end is the network device and the receive end is the terminal device, the network device may directly perform duplicate transmission, and send the indication information before, during, or after the duplicate transmission, to instruct the terminal device to perform combined decoding or indicate a performance advantage of combined decoding. Initial transmission: The network device sends data/information to the terminal device for the first time, or information received by the terminal device for the first time is determined as initially transmitted information. In this case, the information received by the terminal device for the first time may also be information retransmitted by the network device.

Retransmission: The network device retransmits information to replace incorrect or lost data/information. The retransmitted information and the initially transmitted information may be combined, and the combined information is decoded.

Multi-carrier: The multi-carrier is also referred to as carrier aggregation (CA). It means that spectrums of two or more component carriers are aggregated to obtain wider transmission bandwidth. The spectrums of the component carriers may be adjacent continuous spectrums, or may be non-adjacent spectrums in a same frequency band, or even discontinuous spectrums in different frequency bands. User equipment may simultaneously use a plurality of component carriers to transmit or receive data based on a capability and a service requirement of the user equipment. In a CA system, carriers from a same base station are aggregated, or carriers of a macro cell and a micro cell that have ideal backhaul are aggregated. For example, the macro cell and the micro cell are connected by using an optical fiber (in this case, the micro cell may also be a radio frequency head). In this way, the base station may obtain, in time, information carried on a plurality of carriers, and the base station can perform combined scheduling on the plurality of carriers. In addition, downlink transmissions in a plurality of cells in the CA system are synchronous, and an error is less than 260 ns.

For example, the network device may send information to the terminal device by using a plurality of transport blocks, a plurality of code blocks, or a plurality of code block groups in a same time period on a carrier 1 and a carrier 2. A transport block, a code block (code block, CB), or a plurality of code block groups (CBG). One CBG includes one or more CBs. One TB includes one or more CBs, or may include one or more CBGs.

Multi-layer transmission: An NR system supports a large-scale antenna technology MIMO, and resources for transmitting data includes a time domain resource, a frequency domain resource, and a space domain resource. The multi-layer transmission means that orthogonality of space domain, that is, orthogonality of transmission channel space is used, and the network device may send data to the user equipment by using a plurality of spatial channels. Currently, in NR, one codeword (CW) may be mapped to a maximum of four layers. If data needs to be transmitted to more than four layers, two codewords CWs need to be used for mapping. In the standard, one CW is also referred to as one transport block.

Multi-bandwidth part (BWP) transmission: A BWP is introduced in NR, and a plurality of BWPs may be configured on one carrier. For current use of the BWP, refer to use of an LTE carrier. Details are not described in this application.

Higher layer signaling in this application may be signaling sent by a higher-layer protocol layer. The higher-layer protocol layer is at least one of a plurality of protocol layers above a physical layer. For example, the higher-layer protocol layer may be specifically at least one of the following protocol layers: a medium access control (MAC) layer, a radio link control (RLC) layer, a packet data convergence protocol (PDCP) layer, a radio resource control (RRC) layer, and a non-access stratum (NAS).

FIG. 1 shows an architecture of a communications system to which an information transmission method according to this application is applied. The information transmission method includes: A terminal device 130 accesses a wireless network to obtain a service of an external network (for example, Internet) over the wireless network, or communicates with another terminal over the wireless network. The wireless network includes an access network (for example, a radio access network (RAN)) 110 and a core network (CN) 120. The RAN 110 is configured to connect the terminal device 130 to the wireless network, and the CN 120 is configured to manage the terminal device and provide a gateway for communication with the external network.

The RAN 110 may be a network device.

The terminal device in this application may also be referred to as a terminal, or may be referred to as user equipment (UE), an access terminal, a user unit, a user station, a mobile station, a mobile, a remote station, a remote terminal, mobile equipment, a user terminal, wireless telecom equipment, a user agent, user equipment, or a user apparatus. The terminal device may be a station (ST) in a wireless local area network (WLAN), or may be a cellular phone, a cordless telephone set, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, a wearable device, or a terminal device in a next-generation communications system such as a terminal device in a 5th generation (5G) network, a terminal device in a future evolved public land mobile network (PLMN) network, or a terminal device in a new radio communications system.

By way of example and not limitation, in the embodiments of the present invention, the terminal device may also be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices that can implement complete or partial functions without depending on smartphones, for example, smartwatches or smartglasses, and devices that focus on only one type of application function and need to work with other devices such as smartphones, for example, various smart bands or smart jewelry for monitoring physical signs.

In addition, the network device may be a device that communicates with the terminal device, for example, an access point (AP) in a WLAN, a base transceiver station (BTS) in GSM or CDMA, a NodeB (NB) in WCDMA, or may be an evolved NodeB (evolutional NodeB, eNB, or eNodeB) in LTE, a relay station or an access point, a vehicle-mounted device, a wearable device, a network device in a future 5G network, a network device in a future evolved PLMN network, or a new generation NodeB (gNodeB) in the NR system.

In addition, in the embodiments of the present invention, the network device provides a service for a cell, and the terminal communicates with the network device by using a transmission resource (for example, a frequency domain resource, or rather, a spectrum resource) used in the cell. The cell may be a cell corresponding to the network device (for example, a base station). The cell may be served by a macro base station, or may be served by a base station corresponding to a small cell. The small cell herein may include: a metro cell, a micro cell, a pico cell, a femto cell, and the like. These small cells have characteristics of small coverage areas and low transmit power, and are applicable to providing a high-rate data transmission service.

In addition, a plurality of cells may simultaneously work at a same frequency on a carrier in the LTE system or the NR system. In some special scenarios, the carrier described above may be considered to have a same concept as a cell. For example, in a carrier aggregation (CA) scenario, both a carrier index of a secondary component carrier and a cell identifier (Cell ID) of a secondary serving cell that works on the secondary component carrier are carried when the secondary component carrier is configured for UE. In this case, it may be considered that the concept of the carrier is equivalent to that of the cell. For example, the UE accessing a carrier is equivalent to the UE accessing a cell.

Figure 2:
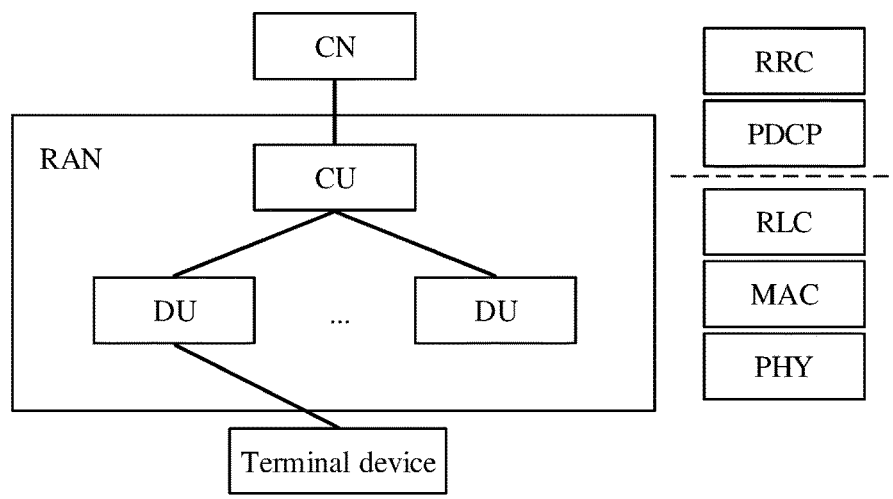
FIG. 2 is a schematic structural diagram 1 of a base station according to this application.

A future access network may be implemented by using a cloud radio access network (C-RAN) architecture. Therefore, in a possible manner, a protocol stack architecture and a function of a conventional base station are divided into two parts: One part is referred to as a central unit (CU), and the other part is referred to as a distributed unit (DU). An actual deployment manner of the CU and the DU is relatively flexible. For example, CU parts of a plurality of base stations are integrated to form a functional entity with a relatively large scale. FIG. 2 is a schematic diagram of a network architecture according to an embodiment of this application. As shown in FIG. 2, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be remote from the baseband apparatus and independently implemented, or may be integrated into the baseband apparatus, or some parts are remote from the baseband apparatus and some parts are integrated into the baseband apparatus. For example, in an LTE communications system, a RAN device (eNB) includes a baseband apparatus and a radio frequency apparatus. The radio frequency apparatus may be arranged remotely relative to the baseband apparatus (for example, a radio remote unit (RRU) is arranged remotely relative to a baseband processing unit (BBU)). The RAN device is implemented by one node, and the node is configured to implement functions of protocol layers such as an RRC layer, a PDCP layer, an RLC layer, and a MAC layer. For another example, in an evolved structure, the baseband apparatus may include a central unit (CU) and a distributed unit (DU), and a plurality of DUs may be controlled by one CU. As shown in FIG. 2, functions of the CU and the DU may be set based on protocol layers of a wireless network. For example, functions of the packet data convergence protocol (PDCP) layer and a protocol layer above the packet data convergence protocol (PDCP) layer are set in the CU; functions of layers below the protocol layer below the PDCP layer, for example, the radio link control (RLC) layer and the media access control (MAC) layer are set in the DU.

The division based on the protocol layer is merely an example, and division may alternatively be performed at another protocol layer, for example, at the RLC layer. Functions of the RLC layer and layers above the RLC layer are set on the CU, and functions of protocol layers below the RLC layer are set on the DU. Alternatively, division is performed at a protocol layer. For example, some functions of the RLC layer and functions of protocol layers above the RLC layer are set on the CU, and remaining functions of the RLC layer and functions of the protocol layers below the RLC layer are set on the DU. In addition, division may alternatively be performed in another manner, for example, performed based on a latency. A function whose processing time needs to meet a latency requirement is set on the DU, and a function whose processing time does not need to meet the latency requirement is set on the CU.

In addition, the radio frequency apparatus may not be arranged in the DU and is arranged remote from the DU, or may be integrated into the DU, or a part of the radio frequency apparatus is arranged remote from the DU, and the other part is integrated into the DU. This is not limited herein.

Figure 3:
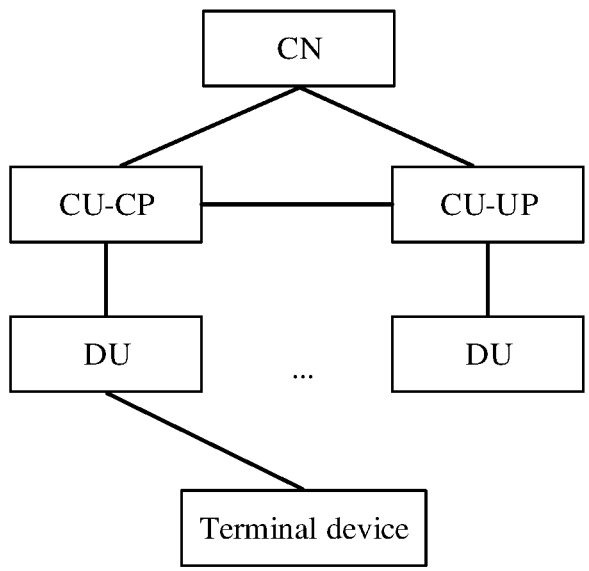
FIG. 3 is a schematic structural diagram 2 of a base station according to this application.

In addition, referring to FIG. 3, compared with the architecture shown in FIG. 2, a control plane (CP) and a user plane (UP) of the CU may be separated and implemented by using different entities: a control plane CU entity (CU-CP entity) and a user plane CU entity (CU-UP entity).

In the foregoing network architecture, signaling generated by the CU may be sent to the terminal by using the DU, or signaling generated by the terminal may be sent to the CU by using the DU. The DU may not parse the signaling, but directly encapsulates the signaling by using a protocol layer and transparently transmits the signaling to the terminal or the CU. In the following embodiments, if transmission of the signaling between the DU and the terminal is described, sending or receiving the signaling by the DU is applicable to this scenario. For example, signaling at the RRC layer or the PDCP layer is finally processed as signaling at a physical layer (PHY) and sent to the terminal, or is converted from received signaling at the PHY layer. In this architecture, the signaling at the RRC or PDCP layer may also be considered as being sent by the DU, or sent by the DU and radio frequency.

In the foregoing embodiment, the CU is classified as a network device in the RAN. In addition, the CU may be alternatively classified as a network device in the CN. This is not limited herein.

The apparatuses in the following embodiments of this application may be located in the terminal device or the network device based on functions implemented by the apparatuses. When the foregoing CU-DU structure is used, the network device may be a CU node, a DU node, or a RAN device including the CU node and the DU node.

Figure 4:
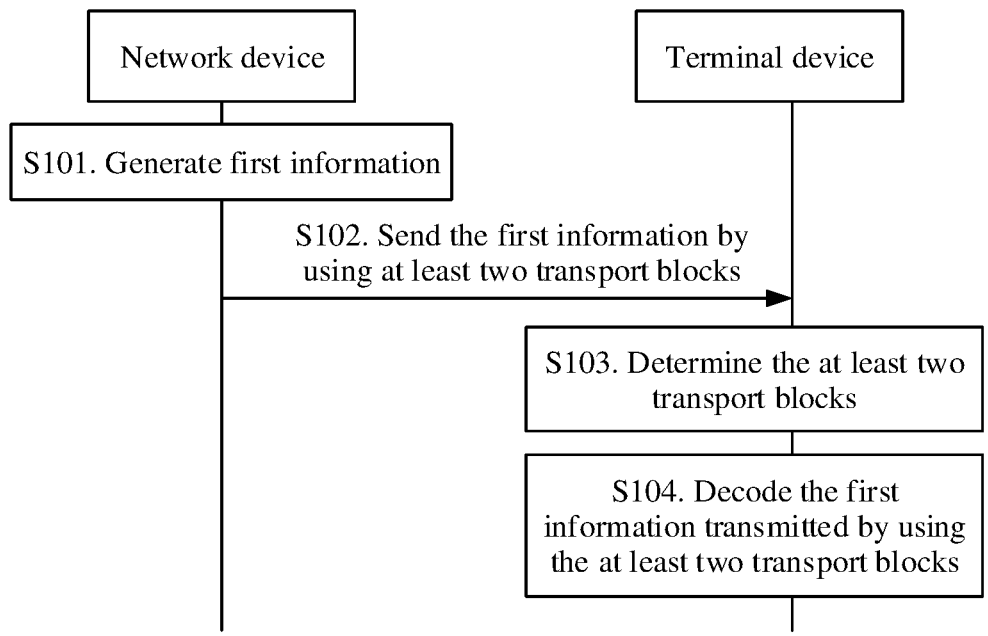
FIG. 4 is a schematic flowchart 1 of an information transmission method according to this application.

As shown in FIG. 4, this application provides an information transmission method, including the following steps.

S101. A network device generates first information. The first information includes at least one of data and control information.

S102. The network device sends the first information to a terminal device by using at least two transport blocks.

It may be understood that, in this application, when the network device sends the first information to the terminal device by using the at least two transport blocks, information carried in each of the at least two transport blocks may be a part of the first information, each of the at least two transport blocks carries the first information or information including the first information, or the at least two transport blocks are same transport blocks. In conclusion, the information carried in the at least two transport blocks may be used by the terminal device to obtain the first information.

For example, the information carried in each of the at least two transport blocks is a part of the first information. The first information is A, and the first information includes a1, a2, and a3. In this case, the network device may send the first information to the terminal device by using a transport block 1 carrying a1, a transport block 2 carrying a2, and a transport block 3 carrying a3. Certainly, in this application, a1 and a2 may alternatively be carried on the transport block 1, and a3 may be carried on the transport block 2 and sent to the terminal device.

For example, the information carried in each of the at least two transport blocks is a part of the first information. The first information is information in one transport block, and the first information includes three CBGs. In this case, the network device may send the first information to the terminal device by using a transport block 1 carrying a CBG 1, a transport block 2 carrying a CBG 2, and a transport block 3 carrying a CBG 3.

For example, the information carried in each of the at least two transport blocks is information including the first information, and the first information is a CBG 1. In this case, the network device may send the first information to the terminal device by using a transport block 1 carrying the CBG 1, a transport block 2 carrying the CBG 1, and a transport block 3 carrying the CBG 1.

Specifically, the first information may be information in one or more TBs, information in one or more CBs, or information in one or more CBGs.

Specifically, in this application, the first information may be divided into a plurality of pieces of subinformation based on a size of information that can be carried in each transport block and a size of the first information, and the subinformation is carried by using the transport block. In this application, the information carried in the at least two transport blocks may be considered as same information or information with a same information source.

S103. The terminal device determines the at least two transport blocks.

S104. The terminal device decodes the first information transmitted by using the at least two transport blocks.

Optionally, that the terminal device decodes the first information transmitted by using the at least two transport blocks in step S104 includes at least one of the following cases:

The terminal device decodes at least one transport block in the at least two transport blocks, to obtain the first information; or the terminal device performs combined decoding on a plurality of transport blocks in the at least two transport blocks, to obtain the first information.

For a process to be described below in which the terminal device decodes information transmitted by using a transport block group, refer to the description herein. To be specific, the terminal device decodes at least one transport block in a transport block group, to obtain the first information, or performs combined decoding on a plurality of transport blocks in the at least two transport blocks, to obtain the first information.

It should be noted that, that the terminal device performs combined decoding on the plurality of transport blocks in the at least two transport blocks, to obtain the first information includes the following two cases: In one case, in this application, if the terminal device fails to separately decode a transport block in the at least two transport blocks, the terminal device may perform combined decoding on a plurality of transport blocks in the at least two transport blocks, to obtain the first information. In another case, the terminal device does not perform separate decoding, but directly performs combined decoding on a plurality of transport blocks in the at least two transport blocks, to obtain the first information. A condition of correct or incorrect decoding is described below in the embodiments of this application.

According to the information transmission method provided in this embodiment of this application, the terminal device determines the at least two transport blocks, and decodes the first information transmitted by using the at least two transport blocks. In this way, when sending information, for example, the first information, to the terminal device, the network device may send the first information to the terminal device by using the at least two transport blocks, thereby improving reliability of receiving the first information by the terminal device. On the other hand, because the first information is carried in a plurality of transport blocks, the first information may be sent to the terminal device by using the plurality of transport blocks transmitted in a period of time or at the same time, so that a transmission latency can be reduced.

It may be understood that, generally, the plurality of transport blocks are carried on at least one physical downlink data channel or physical downlink shared channel (PDSCH). Generally, one PDSCH carries a maximum of two transport blocks. In other words, when a quantity of the plurality of transport blocks is greater than 3, at least two PDSCH channels are required to transmit the plurality of transport blocks.

It should be noted that the network device in the foregoing embodiment may be replaced with another terminal device, that is, information is transmitted between two terminal devices. The foregoing describes an example of information transmission only between the terminal device and the network device. It may be understood that the foregoing method is also applicable to information transmission between two terminal devices or a plurality of terminal devices. When the foregoing method is applicable to the information transmission between two terminal devices or a plurality of terminal devices, the steps related to the network device in this application may be performed by another terminal device that sends the first information to the terminal device. This is not limited in this embodiment of the present invention.

Generally, although the terminal device has a capability of combining information transmitted by using a plurality of transport blocks, if the plurality of transport blocks are always used to carry the same information or information with a same information source, system transmission efficiency is low. Therefore, only when the terminal device needs to ensure highly-reliable transmission, the network device configures, for the terminal device, a function that enables the terminal device to be capable of combining the information in the plurality of transport blocks and decoding the combined information. In other words, the network device adds the first information to the plurality of transport blocks for transmission only in this case. It may be understood that when the network device does not configure, for the terminal device, the function that enables the terminal device to be capable of performing combined decoding or combined decoding on the information in the plurality of transport blocks, the network device may transmit different information or information with different information sources by using the plurality of transport blocks, thereby improving system transmission efficiency. Therefore, optionally, in another embodiment of this application, before step S102, this application further includes the following step.

S105. The network device sends first configuration information to the terminal device, where the first configuration information is used to configure the terminal device to be capable of performing combined decoding on a plurality of transport blocks.

Optionally, it should be noted herein that the first configuration information is only used to configure the terminal device to be capable of performing combined decoding, but does not mean that the terminal device immediately starts to perform combined decoding. The terminal device further needs to receive indication information for the at least two transport blocks used for combined decoding, to determine whether combined decoding needs to be performed on the plurality of transport blocks in the at least two transport blocks.

Optionally, the first configuration information may be further used to configure the terminal device not to perform combined decoding. In this case, even if the terminal device receives the indication information for the at least two transport blocks used for combined decoding, the terminal device still does not perform combined decoding.

In step S105, the network device may indicate, by using the first configuration information, that the terminal device is capable of performing combined decoding.

Optionally, the first configuration information is used to configure the terminal device to be capable of performing combined decoding on information transmitted by using two or more transport blocks.

S106. The terminal device receives the first configuration information, and determines, based on the first configuration information, that the terminal device is capable of performing combined decoding on the plurality of transport blocks.

It should be noted that steps S105 and S106 in this application are mainly used to configure the terminal device, so that the terminal device is capable of performing combined decoding on the plurality of transport blocks. When the terminal device does not have a capability of performing combined decoding on the plurality of transport blocks, steps S105 and S106 may be omitted, that is, steps S105 and S106 are optional.

Optionally, if the terminal device does not receive the first configuration information, when receiving two or more transport blocks, the terminal device may not perform combined decoding on the two or more transport blocks. In other words, the terminal device may consider that information in the two or more transport blocks transmitted by the network device is different information or information with different information sources. In this case, the terminal device does not start an operation of performing combined decoding on the plurality of transport blocks.

Optionally, if steps S105 and S106 are omitted, or when the terminal device does not receive the first configuration information due to a reason (for example, channel quality), and the network device transmits the first information to the terminal device by using two or more transport blocks, to enable the terminal device to obtain the first information by using the plurality of transport blocks, the terminal device may alternatively determine, based on other indication information, whether to perform combined decoding, to obtain the first information transmitted by using the plurality of transport blocks.

Optionally, after receiving the first configuration information, the terminal device may start combined decoding based on the first configuration information, and does not need to receive the indication information. In this scenario, the terminal device does not need to attempt to separately decode the transport blocks.

It should be noted that the first configuration information in this application is used for downlink (that is, a process in which the network device sends transport blocks to the terminal device and the terminal device receives the at least two transport blocks). Further, there may be second configuration information, and the second configuration information is used for uplink (that is, a process in which the terminal device sends transport blocks to the network device, and the network device receives the at least two transport blocks). In other words, configuration may be performed separately for uplink and downlink, and the network device may configure the first configuration information and/or the second configuration information for the terminal device. If downlink data of the terminal device needs highly-reliable transmission, the first configuration information is configured. If uplink data of the terminal device needs highly-reliable transmission, the second configuration information is configured. Flexible configuration can improve receiving or sending efficiency of the terminal device.

Specifically, on one hand, step S103 in this application may be determined in the following manner:

S1031. The terminal device determines first indication information, where the first indication information is used to indicate parameter values of at least one parameter corresponding to the at least two transport blocks, and the at least one parameter includes one or more of the following parameters: a first time period; a frequency domain resource; a precoding matrix parameter; a network identifier; a reference signal; a cell index; and a combination identifier, where the combination identifier is used to indicate a transport block used for combined decoding.

The network identifier is used to identify the terminal device in a cell accessed by the terminal device. For example, the network device may be a radio network temporary identifier (RNTI) in an LTE system.

Optionally, the first indication information in this application may be sent by the network device to the terminal device, or may be owned by the terminal device, that is, pre-stored in the terminal device. In this way, if the first indication information may be sent by the network device to the terminal device, before step S103, the method provided in this application further includes the following step:

S107. The network device sends the first indication information to the terminal device.

Correspondingly, step S1031 may be implemented in the following manner: The terminal device receives the first indication information from the network device.

Specifically, the first indication information determined by the terminal device in this application may be determined by using dynamic signaling, higher layer signaling, or a predefinition. The dynamic signaling is usually indication information carried in downlink control information (DCI).

It should be understood that if the first indication information is pre-stored in the terminal device, S107 may be omitted. That is, S107 is optional.

S1032. The terminal device determines the at least two transport blocks based on the first indication information.

Specifically, the at least two transport blocks include a first transport block and a second transport block; the first indication information indicates that a first parameter in the at least one parameter corresponds to a plurality of parameter values, and parameter values of the first parameter corresponding to the first transport block and the second transport block are different; and/or the first indication information indicates that a second parameter in the at least one parameter corresponds to one parameter value, and parameter values of the second parameter corresponding to the first transport block and the second transport block are the same.

It should be noted that in this application, the first parameter may be one or more of the parameters indicated by the first indication information, and the second parameter may be one or more of the parameters indicated by the first indication information. In addition, different parameters may be used in combination to determine the at least two transport blocks.

It should be noted that, in this embodiment of the present invention, transport blocks on resources whose time domain resource lengths are the same, or transport blocks on resources whose subcarrier spacings are the same are the at least two transport blocks used for combined decoding.

For example, the at least two transport blocks correspond to a first BWP and a second BWP. For example, the at least two transport blocks may include the first transport block and the second transport block, the first transport block corresponds to the first BWP, and the second transport block corresponds to the second BWP.

For example, the at least two transport blocks correspond to a first time period, and correspond to the first BWP and the second BWP. For example, the at least two transport blocks may include the first transport block and the second transport block, the first transport block corresponds to the first BWP, the second transport block corresponds to the second BWP, and a time domain resource of the first transport block and a time domain resource of the second transport block belong to the first time period.

For another example, the first indication information indicates that a second parameter in the at least one parameter corresponds to one parameter value, the parameter value is the combination identifier, and the first transport block and the second transport block correspond to the same combination identifier.

For still another example, the at least two transport blocks correspond to a first precoding matrix parameter, a second precoding matrix parameter, and the combination identifier. For example, the at least two transport blocks may include the first transport block and the second transport block, the first transport block corresponds to the first precoding matrix parameter, the second transport block corresponds to the second precoding matrix parameter, and the first transport block and the second transport block correspond to the same combination identifier. For example, a combination identifier in DCI corresponding to the first transport block is the same as a combination identifier in DCI corresponding to the second transport block, and the DCI corresponding to the first transport block and the DCI corresponding to the second transport block may be same DCI or may be different DCI.

Because the first indication information indicates different content, manners in which the terminal device determines the at least two transport blocks based on the first indication information are different. Therefore, specific implementation of step S1032 is separately described below with reference to specific content of the first indication information.

A1. The first indication information is used to indicate the combination identifier corresponding to the at least two transport blocks, and the combination identifier is used to indicate transport blocks used for combined decoding. The terminal device determines the at least two transport blocks based on a combination identifier corresponding to received transport blocks.

In an example 1, the combination identifier may be a first bit status value, and the terminal device determines a plurality of transport blocks associated with the same combination identifier as the at least two transport blocks. For example, the combination identifier in this application may be an index associated with a plurality of transport blocks. In this case, when receiving the transport blocks associated with the index, the terminal device may perform combined decoding on information in the plurality of transport blocks associated with the index.

For example, a transport block 1, a transport block 2, and a transport block 3 are all associated with an index Y1. In this case, the terminal device may combine information in the transport block 1, the transport block 2, and the transport block 3 that are associated with the index Y1, for example, Y1=10. Both a transport block 4 and a transport block 5 are associated with an index Y2. In this case, the terminal device may combine information in the transport block 4 and the transport block 5 that are associated with the index Y2, for example, Y2=01. The transport block 1, the transport block 2, and the transport block 3 are transport blocks in a first transport block group, and the transport block 4 and the transport block 5 are transport blocks in a second transport block group. It may be understood that the transport block 1, the transport block 2, and the transport block 3 may be scheduled corresponding to three pieces of DCI respectively, or may be scheduled corresponding to one piece of DCI. To be specific, the terminal device combines transport blocks having a same combination identifier carried in scheduling DCI. The DCI may be DCI for scheduling a transport block, or may be another DCI. Alternatively, transport blocks whose combination identifiers are associated may be combined. For example, if it is indicated that an index of the transport block 1 is Y1, an index of the transport block 2 is Y2, and Y1 and Y2 are correspondingly associated, the transport block 1 and the transport block 2 may be combined. Further, an index corresponding to a transport block may be notified in DCI for scheduling the transport block, or may be notified in another DCI. This is not limited in the present invention.

The combination identifier in this application may be indication subinformation, and the indication subinformation includes first indication subinformation and second indication subinformation. The first indication subinformation instructs to combine information in received transport blocks, and the second indication subinformation instructs not to combine information in received transport blocks. In other words, information in transport blocks having a same combination identifier is same information, and information in transport blocks having different combination identifiers is different information.

In the present invention, a same information source means that when a same physical layer transmission bit sequence is modulated and coded, made into a redundancy version, and mapped to a time-frequency domain resource, actual transmission forms of finally transmitted first information may be different due to different modulation and coding schemes, redundancy versions, mapping resources, or other factors. In other words, information with a same information source can be used for combined decoding. On the contrary, even if information with different information sources has a same actual transmission form, combined decoding cannot be performed because the information is different. It may also be understood as that, if combined decoding is performed, the information cannot be correctly decoded no matter how many times the information is transmitted.

For example, the first indication subinformation is 1. When the combination identifier is 1, a code word 1 and a code word 2 carry same information, and the terminal device determines that the code word 1 and the code word 2 may be used for combination. For example, the second indication subinformation is 0. When the combination identifier is 0, the terminal device determines that a code word 1 and a code word 2 carry different information. In this case, the terminal device does not need to combine information in the code word 1 and information in the code word 2. That is, the terminal device may separately decode the information in the code word 1, and separately decode the information in the code word 2. It may be understood that the codeword 1 and the codeword 2 may be scheduled corresponding to same DCI, or may be scheduled corresponding to different DCI.

Certainly, the combination identifier in this application may alternatively correspond to one transport block group. To be specific, the combination identifier is used to indicate whether to combine information in at least one transport block included in one transport block group. Specifically, Table 1 to Table 4 show the combination identifier provided in this application.

TABLE 1

| Combination identifier 1 | Indication |
| --- | --- |
| 0 | Transport blocks not for combination |
| 1 | Transport blocks for combination |

TABLE 2

| Combination identifier 1 | Indication |
| --- | --- |
| 00 | Transport blocks not for combination |
| 10 | Transport blocks that are in the first transport block group and that are for combination |
| 01 | Transport blocks that are in the second transport block group and that are for combination |
| 11 | Transport blocks that are in a third transport block group and that are for combination |

TABLE 3

| Combination identifier 2 | Indication |
| --- | --- |
| 0 | CW not for combination |
| 1 | CW for combination |

TABLE 4

| Combination identifier 2 | Indication |
| --- | --- |
| 00 | A CW cannot be used for combination |
| 10 | A first CW may be used for combination |
| 01 | A second CW may be used for combination |
| 11 | The first CW and the second CW may be used for combination |

In this case, the terminal device determines, based on combination identifier information in DCI corresponding to transport blocks, transport blocks that can or cannot be used for combination.

It may be understood that, that the first CW may be used for combination means that a transport block corresponding to the first CW and at least one transport block other than a transport block corresponding to the second CW may be used for combined decoding. That the second CW may be used for combination means that a transport block corresponding to the second CW and at least one transport block other than a transport block corresponding to the first CW may also be used for combined decoding. That the first CW and the second CW may be used for combination means that a transport block corresponding to the first CW and a transport block corresponding to the second CW may be used for combined decoding, or a transport block other than the two transport blocks may further be used for combined decoding. That the CW cannot be used for combination means that transport blocks corresponding to the first CW and the second CW cannot be used for combined decoding, or transport blocks corresponding to the first CW and the second CW cannot be combined or cannot be used for combined decoding with another transport block.

It should be noted that, whether combined decoding can be performed in the present invention means whether combined decoding can be performed on transport blocks that overlap on a time domain resource, and does not include a case of combined decoding on initially transmitted and retransmitted transport blocks that are in a conventional HARQ process and that do not overlap in time domain.

On the other hand, the combination identifier may be a combination identifier 1 and/or a combination identifier 2, that is, there may be only one combination identifier, or there may be two combination identifiers. The combination identifier 2 is used to instruct to combine information carried in transport blocks that are transmitted at different layers and have a same identifier. For example, a size of the combination identifier 2 may be 1 bit.

The combination identifier 1 is used to indicate whether combination can be performed between carriers or BWPs. The combination identifier 2 is used to indicate whether combination can be performed between different layers. The combination identifier 1 is used to identify whether combination can be performed between frequency domain resources. For example, transport blocks on a carrier 1 and a carrier 2 corresponding to a combination identifier 10 may be combined, and the carrier 1 and the carrier 2 are in a first frequency domain resource group. Further, the combination identifier 1 is used to identify whether a CW 1 and a CW 2 transmitted on the carrier 1 can be combined or separately combined. Therefore, there are the following possible combination methods.

Possible method 1: CWs 1 on the carrier 1 and the carrier 2 are combined.

Possible method 2: CWs 2 on the carrier 1 and the carrier 2 are combined.

Possible method 3: CWs 1 and CWs 2 on the carrier 1 and the carrier 2 are combined.

Possible method 4: The CW 1 on the carrier 1 and a CW 2 on the carrier 2 are combined.

Possible method 5: The CW 2 on the carrier 1 and a CW 1 on the carrier 2 are combined.

Possible method 6: The CW 1 on the carrier 1 and a CW 1 and a CW 2 on the carrier 2 are combined.

Possible method 7: The CW 2 on the carrier 1 and a CW 1 and a CW 2 on the carrier 2 are combined.

Possible method 8: The CW 1 and a CW 2 on the carrier 1 and a CW 1 on the carrier 2 are combined.

Possible method 9: The CW 1 and a CW 2 on the carrier 1 and a CW 2 on the carrier 2 are combined.

Details are shown in Table 5 to Table 7.

TABLE 5

| Combination identifier 1 | Indication |
|---|---|
| 00 | Transport blocks not for combination |
| 10 | The first frequency domain resource group may be used for combination |
| 01 | A second frequency domain resource group may be used for combination |
| 11 | A third frequency domain resource group may be used for combination |

TABLE 6

| Combination identifier 2-1 | Indication |
|---|---|
| 0 | CW 1 not for combination |
| 1 | CW 1 for combination |

TABLE 7

| Combination identifier 2-2 | Indication |
|---|---|
| 0 | CW 2 not for combination |
| 1 | CW 2 used for combination |

That is, the terminal device determines, by using the combination identifier, whether a received transport block is a transport block in the at least two transport blocks.

For example, the method provided in this embodiment of this application further includes: receiving, by the terminal device, downlink control information (DCI), where the DCI includes the combination identifier, and the DCI is used to indicate the at least two transport blocks. In this way, the terminal device may determine the at least two transport blocks based on the DCI.

A2. The terminal device determines the at least two transport blocks based on the first time period indicated by the first indication information.

It may be understood that the terminal device determines information about the first time period of the at least two transport blocks. The terminal device determines the at least two transport blocks based on the information about the first time period of the at least two transport blocks.

Specifically, the terminal device determines a plurality of transport blocks received in the first time period as the at least two transport blocks. Specifically, a start time of the first time period is a time point at which the terminal device receives the first indication information plus K symbols or slots. K is greater than or equal to 0. Certainly, the start time of the first time period may alternatively be indicated by the network device in the first indication information. In addition, duration of the first time period may be a predefined time length, or may be indicated in the second indication information or another information. This is not limited in this application.

Specifically, the first indication information may be information used to indicate the first time period, may be the first time period, or may be an index associated with the first time period. That is, it may be understood that all transport blocks in the first time period may be used for combination.

In an example 1, the first indication information indicates an index number of a slot or a symbol. It may be understood that when the first indication information indicates a symbol 0 to a symbol 6, a transport block received by the terminal device in the symbol 0 to the symbol 6 is a transport block in the at least two transport blocks. It may be understood that when the first indication information indicates a slot 0, a transport block received by the terminal device in the slot 0 is a transport block in the at least two transport blocks.

In an example 2, the first indication information indicates a relative offset group of a slot or a symbol. It may be understood that the first indication information is carried in the DCI, and the first indication information indicates an offset time or an offset index number relative to a slot or a symbol in which the current DCI is located. For example, if a symbol in which the current DCI is located is 1, and the relative offset group indicated by the first indication information is {2 to 5} symbols, a transport block received by the terminal device in the symbols 3 to 6 is a transport block in the at least two transport blocks. If a slot in which the current DCI is located is 0, and the relative offset group indicated by the first indication information is {0 to 1} slots, a transport block received by the terminal device in the slot 0 and the slot 1 is a transport block in the at least two transport blocks. It should be noted that there may be one or more pieces of information in the relative offset group. This is not limited in this embodiment of this application.

To be specific, the terminal device determines, based on the first time period, whether a received transport block is a transport block in the at least two transport blocks.

A3. The terminal device determines the first indication information, where the first indication information is used to indicate the frequency domain resource corresponding to the at least two transport blocks.

It may be understood that the terminal device determines information about the frequency domain resource of the at least two transport blocks. The terminal device determines the at least two transport blocks based on the information about the frequency domain resource of the at least two transport blocks.

The first indication information may indicate an identifier of the frequency domain resource, or may indicate an index associated with the frequency domain resource. This is not limited in this application.

In an example 1, the first indication information indicates an index of a carrier. It may be understood that when the first indication information indicates a carrier 0 and a carrier 1, a transport block received by the terminal device on the carrier 0 and the carrier 1 is a transport block in the at least two transport blocks.

In an example 2, the first indication information indicates an index of a BWP. It may be understood that when the first indication information indicates a BWP 0, a BWP 1, and a BWP 2, a transport block received by the terminal device in the BWP 0, the BWP 1, and the BWP 2 is a transport block in the at least two transport blocks.

In other words, the terminal device determines, by using the frequency domain resource, whether a received transport block is a transport block in the at least two transport blocks.

Specifically, the terminal device determines, based on two or more frequency domain resources indicated by the first indication information, transport blocks transmitted on the two or more frequency domain resources as the at least two transport blocks. Specifically, the frequency domain resource may be a BWP or a carrier.

In this application, A2 and A3 may be used in combination. It may be understood that the terminal device determines, based on the two or more frequency domain resources and the first time period that are indicated by the first indication information, transport blocks transmitted on the two or more frequency domain resources in the first time period as the at least two transport blocks. Specifically, the frequency domain resource may be a BWP or a carrier. That is, all transport blocks that meet a parameter condition are transport blocks that can be used for combined decoding. Details are not described again.

A4. The terminal device determines the first indication information, where the first indication information is used to indicate the precoding matrix parameter corresponding to the at least two transport blocks.

Specifically, the terminal device determines, transport blocks transmitted at the precoding matrix parameter indicated by the first indication information, as the at least two transport blocks based on the precoding matrix parameter indicated by the first indication information.

It may be understood that the terminal device determines information about the precoding matrix parameter of the at least two transport blocks. The terminal device determines the at least two transport blocks based on the information about the precoding matrix parameter of the at least two transport blocks.

The first indication information may indicate an identifier of the precoding matrix parameter, or may indicate an index associated with the precoding matrix parameter. This is not limited in this application.

In an example 1, the first indication information indicates an index of the precoding matrix parameter. It may be understood that when the first indication information indicates a precoding matrix parameter 1 and a precoding matrix parameter 2, a transport block received by the terminal device at the precoding matrix parameter 1 and the precoding matrix parameter 2 is a transport block in the at least two transport blocks. To be specific, the terminal device determines, by using the precoding matrix parameter, whether transport blocks received on different beams are transport blocks in the at least two transport blocks.

A5. The terminal device determines the first indication information, where the first indication information is used to indicate the network identifier corresponding to the at least two transport blocks.

Specifically, the terminal device determines transport blocks scrambled by using the network identifier or the cell index as the at least two transport blocks based on the network identifier or the cell index indicated by the first indication information.

It may be understood that the terminal device determines information about the network identifier of the at least two transport blocks. The terminal device determines the at least two transport blocks based on the information about the network identifier of the at least two transport blocks.

The first indication information may indicate the network identifier, or may indicate an index associated with the network identifier. This is not limited in this application.

In an example 1, the first indication information indicates an index of the network identifier, for example, an RNTI. It may be understood that when the first indication information indicates an RNTI 1 and an RNTI 2, a transport block received by the terminal device at the RNTI 1 and the RNTI 2 is a transport block in the at least two transport blocks. In other words, the terminal device determines, by using the RNTI, whether a received transport block is a transport block in the at least two transport blocks.

A5. The terminal device determines the first indication information, where the first indication information is used to indicate information about the reference signal corresponding to the at least two transport blocks.

Specifically, the terminal device determines, a transport block received on the reference signal indicated by the first indication information, as the at least two transport blocks.

It may be understood that the terminal device determines the information about the reference signal of the at least two transport blocks. The terminal device determines the at least two transport blocks based on the information about the reference signal of the at least two transport blocks.

The first indication information may indicate an identifier of the reference signal, or may indicate an index associated with the reference signal, a scrambling code corresponding to the reference signal, sequence information corresponding to the reference signal, frequency domain information corresponding to the reference signal, sequence sorting information corresponding to the reference signal, or a time domain location and/or time domain density information corresponding to the reference signal. This is not limited in this application.

In an example 1, the first indication information indicates the reference signal, for example, sequence information of the reference signal. It may be understood that when the first indication information indicates a sequence 1 and a sequence 2, a transport block received by the terminal device by using reference signals with the sequences of 1 and 2 is a transport block in the at least two transport blocks. In other words, the terminal device determines, by using a sequence, whether a received transport block is a transport block in the at least two transport blocks.

In an example 2, the first indication information indicates the reference signal, for example, information about a port number. It may be understood that when the first indication information indicates port numbers 1 and 3 and port numbers 4 and 8, a transport block received by the terminal device at the port numbers 1 and 3 and the port numbers 4 and 8 is a transport block in the at least two transport blocks. In other words, the terminal device determines, based on the information about the port number, whether a received transport block is a transport block in the at least two transport blocks. In other words, even if a transport block is transmitted at another layer, the terminal device does not combine information in the transport block transmitted at the another layer with information in the transport block transmitted at the layer 8 and the layer 0. By analogy, other cases of the reference signal are not described herein in this application.

A6. The terminal device determines the first indication information, where the first indication information is used to indicate the cell index corresponding to the at least two transport blocks.

Specifically, the terminal device determines, based on the cell index indicated by the first indication information, transport blocks scrambled by using the cell index as the at least two transport blocks.

It may be understood that the terminal device determines information about the cell index of the at least two transport blocks. The terminal device determines the at least two transport blocks based on the information about the cell index of the at least two transport blocks.

The first indication information may indicate an identifier of the cell index, or may indicate an index associated with the cell index, or a scrambling code corresponding to the cell index. This is not limited in this application.

In an example 1, the first indication information indicates the cell index, for example, identification information of the cell index. It may be understood that when the first indication information indicates an identifier 1 and an identifier 2, a transport block received by the terminal device in cells whose cell indexes are the identifier 1 and the identifier 2 is a transport block in the at least two transport blocks. In other words, the terminal device determines, by using the cell index, whether a received transport block is a transport block in the at least two transport blocks.

A7. The terminal device determines the first indication information, where the first indication information is used to indicate the HARQ process number corresponding to the at least two transport blocks. Specifically, the terminal device determines, transport blocks received at the HARQ process number indicated by the first indication information, as the at least two transport blocks.

It may be understood that the terminal device determines information about the HARQ process number of the at least two transport blocks. The terminal device determines the at least two transport blocks based on the information about the HARQ process number of the at least two transport blocks.

The first indication information may indicate an identifier of the HARQ process number, or may indicate an index associated with the HARQ process number. This is not limited in this application.

In an example 1, the first indication information indicates the HARQ process number, for example, identification information of the HARQ process number. It may be understood that, when the first indication information indicates an HARQ process number 1 and an HARQ process number 2, a transport block received by the terminal device at the HARQ process numbers 1 and 2 on different carriers or a same carrier, in different BWPs and cells or a same BWP and cell is a transport block in the at least two transport blocks. In other words, the terminal device determines, by using the HARQ process number, whether a received transport block is a transport block in the at least two transport blocks.

Specifically, the first indication information may be information used to indicate the first time period, may be the first time period, or may be an index associated with the first time period. The first indication information may be information used to indicate an identifier of the frequency domain resource, may be an identifier of the frequency domain resource, or may be an index associated with the frequency domain resource. This is not limited in this application. By analogy, content indicated by the first indication information may be the content, or may be an index or information associated with the content. Details are not described herein again in this application.

It should be noted that each of the first time period, the frequency domain resource, the precoding matrix parameter, the network identifier, the reference signal, the cell index, the HARQ process number, and the combination identifier may include two or more parameters. For example, the frequency domain resource indicated by the first indication information may be a frequency domain resource subset, and the frequency domain resource subset includes two or more frequency domain resources; the network identifier indicated by the first indication information may be a network identifier subset, and the network identifier subset includes two or more network identifiers; and the cell index indicated by the first indication information may be a cell index subset, and the cell index subset includes two or more cell indexes. The reference signal indicated by the first indication information may be a reference signal subset, and the reference signal subset includes port numbers or layers of at least two reference signals. By analogy, details are not described herein again in this application.

It may be understood that information about the reference signal indicated by the first indication information may alternatively be a reference signal port number or layer.

The frequency domain resource may be at least one of a BWP, a carrier, or a cell. This is not limited in this application. This is not limited in this application.

It should be noted that in this application, the terminal device may combine a plurality of pieces of content indicated by the first indication information to determine the at least two transport blocks. Specifically, the terminal device determines, transport blocks that are transmitted on different frequency domain resources in the first time period, as the at least two transport blocks. For another example, the terminal device determines, a plurality of transport blocks scrambled by using a network identifier set in the first time period, as the at least two transport blocks.

Based on the first indication information, the at least two transport blocks in this application meet at least one of the following conditions, and only the first transport block and the second transport block are used as an example in this application for description: The first transport block and the second transport block are any two transport blocks in the at least two transport blocks; or the first transport block represents one or more of the at least two transport blocks, and the second transport block represents one or more of the at least two transport blocks. The first transport block and the second transport block in this application do not have any indicative meaning. However, a case in which a third transport block and a fourth transport block use a same condition for determining is not limited.

Specifically, the first transport block and the second transport block meet at least one of the following conditions:
Condition 1: The first transport block and the second transport block correspond to different reference signal groups, reference signals included in the different reference signal groups are different, and one reference signal group includes at least one reference signal.

For example, the first transport block corresponds to a first reference signal group, and the second transport block corresponds to a second reference signal group. At least one reference signal included in the first reference signal group is different from at least one reference signal included in the second reference signal group. The first reference signal group and the second reference signal group may be predefined, or may be notified by using higher layer signaling or dynamic signaling. It should be understood that transport blocks received on the first reference signal group and the second reference signal group are transport blocks that are in the at least two transport blocks and that may be used for combination. In this case, the terminal device may dynamically determine the transport blocks used for combination.

Optionally, in Condition 1, the first transport block and the second transport block are received on a same time domain resource and a same frequency domain resource.

Optionally, that the reference signals included in the different reference signal groups are different includes at least one of the following cases: Time domain resource locations of the reference signals are different; frequency domain resource locations of the reference signals are different (particularly, frequency domain resource locations are different, one corresponds to a reference signal in an odd subcarrier group, and another corresponds to a reference signal in an even subcarrier group); sequence groups of the reference signals are different, and sequences in the sequence groups are sorted different; or sequences are different. The information about the reference signal in A5 may further be included, and details are not described herein in this embodiment of the present invention.

Condition 2: The first transport block and the second transport block are located on different frequency domain resources. For example, the first transport block is located on a first frequency domain resource, the second transport block is located on a second frequency domain resource, and indexes of the first frequency domain resource and the second frequency domain resource are different.

Specifically, the frequency domain resource on which the first transport block is located is carried on a first carrier, the frequency domain resource on which the second transport block is located is carried on a second carrier, and index numbers of the first carrier and the second carrier are different.

Specifically, the frequency domain resource on which the first transport block is located is carried in a first BWP, the frequency domain resource on which the second transport block is located is carried in a second BWP, and index numbers of the first BWP and the second BWP are different.

Specifically, the frequency domain resource on which the first transport block is located is carried in a first cell, the frequency domain resource on which the second transport block is located is carried in a second cell, and index numbers of the first cell and the second cell are different.

Optionally, under Condition 2, the time domain resource on which the first transport block is located and the time domain resource on which the second transport block is located partially or completely overlap. For example, the first transport block occupies symbols 0 to 6, and the second transport block occupies symbols 5 to 7.

Specifically, lengths of the time domain resources occupied by the first transport block and the second transport block may be the same or may be different. The first frequency domain resource and the second frequency domain resource may be predefined, or may be notified by using higher layer signaling or dynamic signaling. It should be understood that transport blocks received on the first frequency domain resource and the second frequency domain resource are transport blocks that are in the at least two transport blocks and that may be used for combination. In this case, the terminal device may dynamically determine the transport blocks used for combination.

Optionally, for example, the frequency domain resource is a BWP, and the first BWP and the second BWP partially overlap or do not overlap in frequency domain.

Condition 3: The first transport block and the second transport block are scrambled by using different network identifiers. To be specific, the first transport block is scrambled by using a first network identifier, the second transport block is scrambled by using a second network identifier, and the first network identifier and the second network identifier are different. The first network identifier and the second network identifier may be predefined, or may be notified by using higher layer signaling or dynamic signaling. It should be understood that transport blocks received at the first network identifier and the second network identifier are transport blocks that are in the at least two transport blocks and that may be used for combination. In this case, the terminal device may dynamically determine the transport blocks used for combination.

Condition 4: The first transport block is mapped to at least one port in a first port number group of a demodulation reference signal (DMRS), the second transport block is mapped to at least one port in a second port number group of the DMRS, and port numbers in the first port number group and the second port number group are different. Specifically, the first port number group includes two or more port numbers, and the second port number group includes two or more port numbers. For example, the port numbers included in the first port number group are 0, 1, 2, and 3, and the first transport block is mapped to at least one of the port numbers 0, 1, 2, and 3; and the port numbers included in the second port number group are 4, 5, 6, 7, and the second transport block is mapped to at least one of the port numbers 4, 5, 6, and 7. The first port number group and the second port number group may be predefined, or may be notified by using higher layer signaling or dynamic signaling. It should be understood that transport blocks received at the first port number group and the second port number group are transport blocks that are in the at least two transport blocks and that may be used for combination. In this case, the terminal device may dynamically determine the transport blocks used for combination.

5. The first transport block and the second transport block are located in the first time period in time domain. 6. The first transport block and the second transport block correspond to a same precoding matrix parameter or different precoding matrix parameters. 7. The first transport block and the second transport block correspond to a same cell index or different cell indexes. 8. The first transport block and the second transport block correspond to a same combination identifier.

It should be noted that the parameter values of the at least one parameter indicated by the first indication information may be used in combination. Therefore, the first transport block and the second transport block further meet results presented by combining two or more parameters. For example, the first transport block and the second transport block are located in the first time period in time domain, and the first transport block and the second transport block are scrambled by using different network identifiers. The first transport block and the second transport block are located in the first time period, and the first transport block and the second transport block correspond to a same precoding matrix parameter or different precoding matrix parameters. The first transport block and the second transport block are located in the first time period in time domain, and the first transport block and the second transport block correspond to a same cell index or different cell indexes. The first transport block and the second transport block are located in the first time period in time domain, and the first transport block and the second transport block correspond to a same combination identifier. The first transport block and the second transport block correspond to a same precoding matrix parameter or different precoding matrix parameters, and the first transport block and the second transport block correspond to a same cell index or different cell indexes. The first transport block and the second transport block are located in the first time period in time domain, the first transport block and the second transport block correspond to a same combination identifier, and the first transport block and the second transport block correspond to a same precoding matrix parameter or different precoding matrix parameters.

It may be understood that when the terminal device determines that a transport block meets the parameter value of the at least one parameter indicated by the first indication information, the transport block is a transport block that can be used for combined decoding. The first indication information may be higher layer signaling (semi-static signaling) or dynamic signaling, or may be predefined.

Specifically, on the other hand, step S103 in this application may be determined in the following manner:

S1033. The terminal device determines second indication information, where the second indication information is used to indicate parameter values of at least one parameter corresponding to the at least two transport blocks, and the at least one parameter includes one or more of the following parameters: a transport block size; an HARQ process number; a new data indicator NDI; an HARQ-ACK resource; a redundancy version RV; a time domain resource and/or a frequency domain resource; a start time of a first timer; and a combination identifier, where the combination identifier is used to indicate a transport block used for combined decoding.

Optionally, the second indication information in this application may be sent by the network device to the terminal device, or may be sent by another device to the network device. This is not limited in this application.

If the second indication information may be sent by the network device to the terminal device, that is, before step S103, if S108 of sending the second indication information to the terminal device by the network device is further included, the second indication information may be higher layer signaling (semi-static signaling) or dynamic signaling, or may be predefined.

S1034. The terminal device determines the at least two transport blocks based on the second indication information.

Specifically, the at least two transport blocks include a first transport block and a second transport block; the second indication information indicates that a third parameter in the at least one parameter corresponds to a plurality of parameter values, and parameter values of the third parameter corresponding to the first transport block and the second transport block are different; and/or the second indication information indicates that a fourth parameter in the at least one parameter corresponds to one parameter value, and parameter values of the fourth parameter corresponding to the first transport block and the second transport block are the same.

For example, the third parameter corresponding to the at least two transport blocks is the HARQ process number, and the first transport block and the second transport block have different HARQ process numbers. The terminal device may perform combined decoding on transport blocks at two different HARQ process numbers. It may be understood that an association relationship between the at least two HARQ process numbers may be predefined, or may be notified by using higher layer signaling or dynamic signaling.

For example, the fourth parameter corresponding to the at least two transport blocks is the redundancy version. For example, the first transport block and the second transport block have different redundancy versions, for example, RV=0 and RV=3. The terminal device may perform combined decoding on transport blocks having two different redundancy versions. It may be understood that an association relationship between the at least two redundancy versions may be predefined, or may be notified by using higher layer signaling or dynamic signaling.

For another example, the third parameter corresponding to the at least two transport blocks is a first time domain and/or frequency domain resource, and a second time domain and/or frequency domain resource. For example, the first transport block corresponds to the first time domain and/or frequency domain resource, and the second transport block corresponds to the second time domain and/or frequency domain resource. The first time domain and/or frequency domain resource is different from the second time domain and/or frequency domain resource. For example, the terminal device may perform combined decoding on transport blocks on different frequency domain resources. It may be understood that an association relationship between the at least two frequency domain resources may be predefined, or may be notified by using higher layer signaling or dynamic signaling.

For another example, the third parameter corresponding to the at least two transport blocks is the transport block size, and the first transport block and the second transport block have a same transport block size or different transport block sizes. The terminal device may perform combined decoding on transport blocks of different transport block sizes. It may be understood that an association relationship between sizes of the at least two transport block may be predefined, or may be notified by using higher layer signaling or dynamic signaling. Further, the sizes of the at least two transport block fall into a same transport block set, or a difference between the sizes of the at least two transport block falls into a difference range. For example, a difference between 100 bits and 99 bits is 1 bit. Assume that the difference range is defined as 8 bits. Transport blocks corresponding to the sizes of the two transport block are the at least two transport blocks that can be used for combined decoding. The transport block set and the difference range are association relationships between the sizes of the at least two transport blocks.

For example, the third parameter corresponding to the at least two transport blocks is the NDI. For example, both the first transport block and the second transport block have NDIs that wrap around. For example, the NDIs corresponding to the first transport block and the second transport block may be 1.

The third parameter may be one or more of parameters indicated by the second indication information, and the fourth parameter may be one or more of parameters indicated by the second indication information.

For example, the fourth parameter corresponding to the at least two transport blocks is the HARQ process number, and the first transport block and the second transport block have a same HARQ process number.

For example, the fourth parameter corresponding to the at least two transport blocks is the redundancy version. For example, the first transport block and the second transport block have a same redundancy version, for example, RV=3.

For example, the fourth parameter corresponding to the at least two transport blocks is the NDI. For example, the first transport block and the second transport block have a same NDI, for example, NDI=0 or 1.

For another example, the third parameter corresponding to the at least two transport blocks is a first time domain and/or frequency domain resource, and a second time domain and/or frequency domain resource. For example, the first transport block corresponds to the first time domain and/or frequency domain resource, and the second transport block corresponds to the second time domain and/or frequency domain resource. The first frequency domain resource and the second frequency domain resource are the same, and/or the first time domain resource and the second time domain resource are the same or partially overlap.

For another example, the fourth parameter corresponding to the at least two transport blocks is the transport block size (TBS). For example, the first transport block and the second transport block have a same transport block size. For example, TBS=256 bits, or TBS+cyclic redundancy check (CRC)=256+24 bits.

For another example, the fourth parameter corresponding to the at least two transport blocks is the start time of the first timer and the HARQ process number. For example, both the first transport block and the second transport block are received within the start time of the first timer at the same HARQ process number.

For still another example, the fourth parameter corresponding to the at least two transport blocks is a first time domain and/or frequency domain resource, a second time domain and/or frequency domain resource, and the HARQ process number. For example, the first transport block corresponds to the first time domain and/or frequency domain resource, the second transport block corresponds to the second time domain and/or frequency domain resource, and the first transport block and the second transport block have the same HARQ process number.

For another example, if the fourth parameter corresponding to the at least two transport blocks is the transport block size, and the third parameter is a first HARQ-ACK resource and a second HARQ-ACK resource, the first transport block and the second transport block have the same transport block size, the first transport block corresponds to the first HARQ-ACK resource, and the second transport block corresponds to the second HARQ-ACK resource.

For another example, if the third parameter corresponding to the at least two transport blocks is the NDI, and the corresponding third or fourth parameter is the transport block size, the first transport block and the second transport block have a same transport block size, the first transport block corresponds to a first NDI, and the second transport block corresponds to a second NDI. The first NDI and the second NDI may be the same or may be different, but an association relationship depends on whether the first NDI wraps around compared with what the first NDI does in previous transmission. When both the first NDI and the second NDI represent that the first NDI and the second NDI wrap around this time (that is, initial transmission, but specific values of the first NDI and the second NDI may be different or may be the same), the first transport block and the second transport block may be used for combined decoding. When both the first NDI and the second NDI indicate that the first NDI and the second NDI do not wrap around this time (that is, retransmission, but specific values of the first NDI and the second NDI may be different or may be the same), the first transport block and the second transport block may also be used for combined decoding. When the first NDI represents that the first NDI wraps around this time and the second NDI represents that the second NDI does not wrap around this time (that is, initial transmission and retransmission, but specific values of the first NDI and the second NDI may be different or may be the same), the first transport block and the second transport block may not be used for combined decoding.

Specifically, under the indication of the second indication information, the at least two transport blocks meet at least one of the following conditions: sizes of the at least two transport blocks are equal to the transport block size indicated by the second indication information; the at least two transport blocks are transport blocks received by the terminal device within the start time of the first timer indicated by the second indication information; the at least two transport blocks are transport blocks received by the terminal device at the HARQ process number indicated by the second indication information; the at least two transport blocks are transport blocks received by the terminal device on the time domain resource and/or the frequency domain resource indicated by the second indication information; the at least two transport blocks are transport blocks received by the terminal device at the new data indicator NDI indicated by the second indication information; the at least two transport blocks are transport blocks received by the terminal device on the HARQ-ACK resource indicated by the second indication information; and redundancy versions RVs corresponding to the at least two transport blocks are the redundancy version indicated by the second indication information.

Specifically, step S134 in this application may be implemented in a plurality of manners:

B1. The terminal device determines the at least two transport blocks based on sizes of received transport blocks.

Specifically, the terminal device determines the transport block size based on information such as an MCS in downlink control information (downlink control information, DCI).

In an example 1, the terminal device determines transport blocks belonging to a first transport block set as the at least two transport blocks. The first transport block set includes a size of at least one transport block. Optionally, the terminal device determines transport blocks less than or equal to a first transport block size threshold and/or greater than or equal to a second transport block size threshold as the at least two transport blocks. Optionally, the terminal device determines transport blocks whose transport block sizes fall within a same transport block set and/or transport blocks whose transport block size differences fall within a difference range, as the at least two transport blocks.

In an example 2, the terminal device determines transport blocks of a same size as the at least two transport blocks.

B2. The terminal device determines, transport blocks received within the start time of the first timer, as the at least two transport blocks.

Specifically, the start time of the first timer may be determined based on a time at which the terminal device receives the first configuration information/the first indication information/the second indication information/the first information plus K symbols or slots, where K is greater than or equal to 0. Duration of the first timer may be a predefined time length, or may be indicated in other information before the first configuration information/the first indication information/the second indication information/the first information is received. This is not limited in this application.

B3. The terminal device determines, transport blocks received at a same process number of different frequency domain resources, as the at least two transport blocks. Because when the network device schedules same process numbers, it is considered that the current transport blocks carry same information or information with a same information source. For example, the terminal device determines a transport block 1 received at a first process number of a first frequency domain resource (carrier), and a transport block 2 received at a first process number of a second frequency domain resource (carrier) as the at least two transport blocks.

In an example 2, the terminal device determines, transport blocks received at process numbers that are of different frequency domain resources and that have a correspondence, as the at least two transport blocks. This is because when the network device schedules the process numbers that have a correspondence, it is considered that the current transport blocks TBs have same content. For example, the terminal device determines a transport block 1 received at a first process number of a first frequency domain resource (carrier), and a transport block 2 received at a second process number of a second frequency domain resource (carrier) as the at least two transport blocks. A binding relationship between the first process number and the second process number may be predefined, or may be notified by using higher layer signaling or dynamic signaling.

B4. The terminal device determines the at least two transport blocks based on a new data indicator (NDI) of a received transport block.

Specifically, B4 may be implemented in the following manners.

In an example 1, the terminal device determines that a same new data indicator NDI is received, and the terminal device determines received transport blocks as the at least two transport blocks.

In an example 2, the terminal device determines that all indicators of received transport blocks are NDIs that have wrapped around (indicating initial transmission), and the terminal device determines the received transport blocks as the at least two transport blocks. That the new data indicator NDI wraps around may be understood as: For example, if the NDI indicates 0 last time but indicates 1 this time, or there is no NDI last time, it is considered that transmission is the initial transmission.

Therefore, the terminal device may determine, based on the NDI, that the received transport blocks are the at least two transport blocks.

B5. The terminal device determines the at least two transport blocks based on an HARQ-ACK resource indicated in DCI corresponding to each of received transport blocks.

For example, the terminal device determines an HARQ-ACK resource indicated in DCI corresponding to each of a plurality of transport blocks, and determines transport blocks having a same HARQ-ACK resource as the at least two transport blocks. That the HARQ-ACK resources are the same may mean at least one of the following: Frequency domain resources are the same, code domain is the same, time domain resources are the same, and mapping manners are the same.

B6. The terminal device determines the at least two transport blocks based on a redundancy version (RV) version indicated in DCI corresponding to each of received transport blocks.

Specifically, the terminal device determines an RV version indicated in DCI corresponding to each of a plurality of transport blocks, and determines transport blocks of a same RV version as the at least two transport blocks.

For example, the terminal device determines an RV version indicated in DCI corresponding to each of a plurality of transport blocks, and determines transport blocks whose RV versions belong to a same RV version set as the at least two transport blocks. For example, transport blocks that all belong to a set {0, 3} are determined as the at least two transport blocks.

It should be noted that redundancy versions of the at least two transport blocks in this application include at least RV=0 or RV=3. When RV=0 or RV=3, the information in the transport blocks can be decoded without depending on another received redundancy version.

Optionally, when a quantity of the at least two transport blocks is greater than or equal to 4, RVs corresponding to these transmitted transport blocks definitely include {0, 2, 3, 1}. That is, transport blocks of all redundancy versions are included. When the quantity of the at least two transport blocks is less than 4, redundancy versions of the at least two transport blocks include at least RV=0 or RV=3. For example, if the at least two transport blocks are a transport block 1, a transport block 2, and a transport block 3, a combination of redundancy versions that may correspond to the transport block 1, the transport block 2, and the transport block 3 may be either one of the following: {0, 2, 3} and {0, 3, 1}.

It should be noted that in this application, the terminal device receives the first indication information only in the first time period, to determine to decode the first information in the at least two transport blocks. That is, the terminal device detects the first indication information and determines content indicated by the first indication information only after receiving the second indication information.

It should be noted that, to enable the terminal device to correctly determine the at least two transport blocks used for combined decoding, the at least two transport blocks selected by the network device in step S102 in this application should meet the foregoing described conditions. In other words, for the network device side, to enable the terminal device to correctly receive the first information, the network device needs to determine the at least two transport blocks by using the parameter indicated by the first indication information or the second indication information, and transmits the first information to the terminal device by using the at least two transport blocks.

After receiving the first information in the at least two transport blocks, the terminal device may correctly decode or may fail to correctly decode the first information in the at least two transport blocks. In this case, the terminal device may provide a feedback for the network device to indicate whether the terminal device correctly decodes the first information or fails to correctly decode the first information, and the network device determines whether to retransmit the first information or transmit information other than the first information. As shown in FIG. 4, the method provided in this application includes the following step.

S109. The terminal device sends first feedback information, where the first feedback information is used to indicate that the terminal device correctly decodes or incorrectly decodes the first information.

Optionally, the first feedback information in this application may be fed back by the terminal device to the network device, or may be fed back by the terminal device to another terminal device that sends the first information to the terminal device. This is not limited in this application.

On one hand, the first feedback information in this application may be fed back by the terminal device to the network device for the at least two transport blocks, and the first feedback information may be a negative acknowledgment (NACK)/acknowledgement (ACK) whose size is equal to 1 bit or an N-bit NACK/ACK, where n is an integer greater than or equal to 2. In this case, the first feedback information may alternatively be a bit sequence. Each bit in the bit sequence is used to indicate whether information transmitted in a transport block associated with the bit is correctly decoded. For example, the bit sequence is 011, where 0 is associated with a transport block 1, and the second 1 and the third 1 in the bit sequence 011 are associated with a transport block 2 and a transport block 3 respectively. If 0 indicates incorrect decoding, and 1 indicates correct decoding, the bit sequence 011 may indicate that information in the transport block 1 is not correctly decoded, and information in the transport block 2 and the transport block 3 is correctly decoded.

Specifically, the first feedback information is first answer information or second answer information. The first answer information is used to indicate that the terminal device correctly decodes the first information in the at least two transport blocks. The second answer information is used to indicate that the terminal device incorrectly decodes the first information in the at least two transport blocks.

To reduce signaling overheads, optionally, the first answer information is a first sequence, and the second answer information is a second sequence. The sequence may be a reference signal sequence or a Zadoff-Chu sequence.

For example, the first answer information is represented by NACK, indicating that the terminal device incorrectly decodes the first information in the at least two transport blocks; and the second answer information is represented by ACK, indicating that the terminal device correctly decodes the first information in the at least two transport blocks. Optionally, the first answer information is 0, and the second answer information is 1. The first answer information and the second answer information may be a NACK or an ACK, or may be other uplink information, for example, specific channel state information (CSI). The CSI includes at least one of the following: a channel quality indicator (CQI), a precoding matrix indicator (PMI), a rank indicator (RI), and a reference signal received power (RSRP).

Optionally, the first feedback information includes at least two pieces of first sub-feedback information, the first sub-feedback information is used to indicate that the terminal device correctly decodes or incorrectly decodes the first information in one of the at least two transport blocks, and that the first feedback information is used to indicate that the terminal device incorrectly decodes the first information in the at least two transport blocks includes at least one of the following cases: All the first sub-feedback information included in the first feedback information indicates that the terminal device incorrectly decodes a transport block in the at least two transport blocks; and a quantity of pieces of first sub-feedback information that is included in the first feedback information and that indicates that the terminal device correctly decodes a transport block in the at least two transport blocks is less than or equal to a quantity of pieces of first sub-feedback information that is included in the first feedback information and that indicates that the terminal device incorrectly decodes a transport block in the at least two transport blocks.

Optionally, the first feedback information includes at least two pieces of first sub-feedback information, the first sub-feedback information is used to indicate that the terminal device correctly decodes or incorrectly decodes the first information in one of the at least two transport blocks, and that the first feedback information is used to indicate that the terminal device correctly decodes the first information in the at least two transport blocks includes at least one of the following cases: The first feedback information includes at least one piece of first sub-feedback information, and the first sub-feedback information indicates that the terminal device correctly decodes a transport block in the at least two transport blocks; and a quantity of pieces of first sub-feedback information that is included in the first feedback information and that indicates that the terminal device correctly decodes a transport block in the at least two transport blocks is greater than or equal to a quantity of pieces of first sub-feedback information that is included in the first feedback information and that indicates that the terminal device incorrectly decodes a transport block in the at least two transport blocks.

Specifically, that the terminal device correctly decodes the first information in the at least two transport blocks includes any one of the following cases.

1. The terminal device correctly decodes a transport block in the at least two transport blocks at least once.

If the terminal device receives a plurality of transport blocks, the terminal device feeds back an ACK to the network device when determining that the terminal device correctly decodes information in at least one transport block; otherwise, the terminal device feeds back a NACK to the network device when determining that the terminal device incorrectly decodes information in the plurality of transport blocks.

2. A quantity of times for which the terminal device correctly decodes a transport block in the at least two transport blocks is greater than or equal to a quantity of times for which the terminal device incorrectly decodes a transport block in the at least two transport blocks. This condition is usually applicable to a scenario that has a high reliability requirement. If there is only one ACK, it does not mean that decoding is definitely correctly performed. Only when a quantity of ACKs is greater than or equal to a quantity of NACKs, it is considered that decoding is correctly performed. Therefore, if a plurality of transport blocks are received, an ACK is fed back if "a quantity of correctly received transport blocks is greater than or equal to a quantity of incorrectly received transport blocks", and a NACK is fed back if "the quantity of correctly received transport blocks is less than the quantity of incorrectly received transport blocks".

3. The terminal device performs combined decoding on a plurality of transport blocks in the at least two transport blocks, and correctly decodes the plurality of transport blocks at least once.

Specifically, the terminal device performs combined decoding on the plurality of transport blocks in the at least two transport blocks, to obtain the first information.

Specifically, that the terminal device incorrectly decodes the first information in the at least two transport blocks includes any one of the following cases:

The terminal device correctly decodes none of the at least two transport blocks. A quantity of times for which the terminal device correctly decodes a transport block in the at least two transport blocks is less than a quantity of times for which the terminal device incorrectly decodes a transport block in the at least two transport blocks. The terminal device performs decoding on a plurality of transport blocks in the at least two transport blocks, and correctly decodes the plurality of transport blocks at no time.

On the other hand, the first feedback information in this application is fed back by the terminal device to the network device for each of the at least two transport blocks, and the terminal device feeds back at least a 1-bit HARQ to the network device for each transport block.

Optionally, when the first feedback information is fed back by the terminal device to the network device for a plurality of transport blocks, the first feedback information fed back for the plurality of transport blocks may carry an identifier of the transport block. Further, a feedback may be provided for each transport block.

Optionally, when the terminal device sends the first feedback information to the network device, the method provided in this application further includes the following steps:

S10. The network device receives the first feedback information sent by the terminal device.

S11. The network device determines, based on the first feedback information, that the terminal device correctly decodes or incorrectly decodes the first information transmitted by using the at least two transport blocks.

Specifically, on one hand, when the first feedback information is fed back by the terminal device to the network device for the at least two transport blocks, the network device may directly determine, based on the first feedback information, that the terminal device correctly decodes or incorrectly decodes the first information transmitted by using the at least two transport blocks. Specifically, step S111 may be specifically implemented in the following manners:

When the first feedback information indicates that the terminal device correctly decodes the first information transmitted by using the at least two transport blocks, the network device determines that the terminal device correctly decodes the first information transmitted by using the at least two transport blocks. When the first feedback information indicates that the terminal device incorrectly decodes the first information transmitted by using the at least two transport blocks, the network device determines that the terminal device incorrectly decodes the first information transmitted by using the at least two transport blocks. When the first feedback information indicates that the terminal device fails to correctly decode the first information that is obtained after combined decoding is performed on a plurality of transport blocks in the at least two transport blocks, the network device determines that the terminal device incorrectly decodes the first information transmitted by using the at least two transport blocks. When the first feedback information indicates that the terminal device correctly decodes the first information that is obtained after combined decoding is performed on a plurality of transport blocks in the at least two transport blocks, the network device determines that the terminal device correctly decodes the first information transmitted by using the at least two transport blocks.

On the other hand, when the first feedback information is fed back by the terminal device to the network device for each of the at least two transport blocks, step S11 may be specifically implemented in the following manners:

S1111. If the network device determines that the terminal device correctly decodes a transport block in the at least two transport blocks at least once, the network device determines that the terminal device correctly decodes the first information transmitted by using the at least two transport blocks.

Specifically, if the network device determines that the first feedback information includes at least one piece of first sub-feedback information, and the at least one piece of first sub-feedback information is used to indicate that the terminal device correctly decodes a transport block in the at least two transport blocks, the network device determines that the terminal device correctly decodes the first information transmitted by using the at least two transport blocks.

S1112. If the network device determines that a quantity of times for which the terminal device correctly decodes a transport block in the at least two transport blocks is greater than or equal to a quantity of times for which the terminal device incorrectly decodes a transport block in the at least two transport blocks, the network device determines that the terminal device correctly decodes the first information transmitted by using the at least two transport blocks.

Specifically, if the network device determines that a quantity of pieces of first sub-feedback information that is included in the first feedback information and that indicates that the terminal device correctly decodes a transport block in the at least two transport blocks is greater than or equal to a quantity of pieces of first sub-feedback information that is included in the first feedback information and that indicates that the terminal device incorrectly decodes a transport block in the at least two transport blocks, the network device determines that the terminal device correctly decodes the first information transmitted by using the at least two transport blocks.

S1113. If the network device determines that combined decoding is performed on a plurality of transport blocks in the at least two transport blocks, and the first information is obtained, the network device determines that the terminal device correctly decodes the first information transmitted by using the at least two transport blocks.

S1114. If the network device determines that a quantity of times for which the terminal device correctly decodes a transport block in the at least two transport blocks is less than a quantity of times for which the terminal device incorrectly decodes a transport block in the at least two transport blocks, the network device determines that the terminal device incorrectly decodes the first information transmitted by using the at least two transport blocks.

Specifically, if the network device determines that a quantity of pieces of first sub-feedback information that is included in the first feedback information and that indicates that the terminal device correctly decodes a transport block in the at least two transport blocks is less than or equal to a quantity of pieces of first sub-feedback information that is included in the first feedback information and that indicates that the terminal device incorrectly decodes a transport block in the at least two transport blocks, the network device determines that the terminal device incorrectly decodes the first information transmitted by using the at least two transport blocks.

S1115. If the network device determines that the terminal device correctly decodes none of the at least two transport blocks, the network device determines that the terminal device incorrectly decodes the first information transmitted by using the at least two transport blocks.

Specifically, if the network device determines that the first feedback information includes all first sub-feedback information indicating that the terminal device incorrectly decodes the transport blocks in the at least two transport blocks, the network device determines that the terminal device incorrectly decodes the first information transmitted by using the at least two transport blocks.

S1116. If the network device determines that the terminal device performs combined decoding on a plurality of transport blocks in the at least two transport blocks, and not obtains the first information, the network device determines that the terminal device incorrectly decodes the first information transmitted by using the at least two transport blocks.

It should be noted that in this application, the terminal device feeds back the first feedback information to the network device. In this way, after receiving the first feedback information, the network device may determine, based on the first feedback information, whether the terminal device correctly decodes the first information transmitted by using the at least two transport blocks. When the network device determines that the terminal device correctly decodes the first information transmitted by using the at least two transport blocks, the terminal device may transmit information different from the first information in the at least two transport blocks to the terminal device by using another two or more transport blocks. For example, the first information in the at least two transport blocks is A, and the network device may send information B to the terminal device after the terminal device feeds back feedback information indicating correct decoding. When the network device determines that the terminal device incorrectly decodes the first information transmitted by using the at least two transport blocks, the terminal device may continue to transmit, to the terminal device, information the same as the first information transmitted by using the at least two transport blocks. For example, if the first information in the at least two transport blocks is A, after the terminal device feeds back feedback information indicating incorrect decoding, the network device may continue to transmit A to the terminal device.

When the network device sends the first information to the terminal device, performance of information in each of a plurality of transport blocks varies. For example, performance of initially transmitted information may be higher than performance of retransmitted information, or performance of retransmitted information is higher than performance of initially transmitted information. Assuming that the performance of the initially transmitted information is higher than the performance of the retransmitted information, after the terminal device determines the initially transmitted information, it may be helpful to subsequently combine following packets. If combined decoding is performed on information at a priority of high performance to low performance, a quantity of times of combined decoding may be reduced, thereby saving power for the terminal device. The information carried in each of the at least two transport blocks may correspond to the following scenarios:

Scenario 1: One of the at least two transport blocks is used for initial transmission, and another transport block except the transport block in the at least two transport blocks is used for retransmission. Scenario 2: Each of the at least two transport blocks is used for retransmission. Scenario 3: Each of the at least two transport blocks is used for initial transmission. Manners in which the terminal device decodes the first information in the at least two transport blocks are different in different scenarios. Therefore, the following separately describes the manners.

That the transport block is used for initial transmission may be understood as: Information transmitted in the transport block is initial transmission information. That the transport block is used for retransmission may be understood as: Information transmitted in the transport block is retransmission information.

On one hand, in Scenario 1, step S104 in this application may be further implemented in the following manner:

S1041. The terminal device separately decodes a transport block used for initial transmission, and decodes at least one transport block used for retransmission, to obtain the first information; and/or the terminal device performs combined decoding on a transport block that is in the at least two transport blocks and that is used for initial transmission, and at least one transport block that is in the at least two transport blocks and that is used for retransmission, to obtain the first information.

It may be understood that, in this application, performance of information transmitted by using the transport block used for initial transmission is higher than performance of information transmitted by using the transport block used for retransmission; performance of information in a transport block that has a high priority and that is in a plurality of transport blocks carrying same information or having a same information source and used for retransmission is higher than performance of information in a transport block that has a low priority and that is used for retransmission; and performance of information transmitted by using a transport block that has a high priority and that is in a plurality of transport blocks carrying same information or having a same information source and used for initial transmission is higher than performance of information transmitted by using a transport block that has a low priority and that is used for initial transmission.

Specifically, the terminal device may determine, based on the following parameters, that one of the at least two transport blocks is the transport block used for initial transmission: a carrier index number, a BWP index number, an RNTI index number, a layer index number, a reference signal sequence group index, a start time of a time domain resource, a length of a time domain resource, a PRB index number of a frequency domain resource, a quantity of frequency domain resources PRBs, a block error rate (BLER) value, and an RV version.

Specifically, each of the at least two transport blocks in this application corresponds to a carrier index number, a BWP index number, an RNTI index number, a layer index number, and a reference signal sequence group index, and the carrier index number, the BWP index number, the RNTI index number, the layer index number, and the reference signal sequence group index corresponding to each of the at least two transport blocks may be sorted in a preset order (in descending order of the index numbers or in ascending order of the index numbers). In this way, the terminal device may determine, in the preset order, a transport block with a largest index number as the transport block used for initial transmission, or determine a transport block with a smallest index number as the transport block used for retransmission. After the terminal device determines the transport block used for initial transmission, the terminal device may sequentially determine, based on the preset order, an order of decoding pieces of first information, and/or an order of combining first information in the transport block used for initial transmission and first information in the at least one transport block used for retransmission. For example, sorting is performed in ascending order or descending order. This is not limited in this application.

For example, a carrier index number corresponding to a transport block 1 is 1, a carrier index number corresponding to a transport block 2 is 2, and a carrier index number corresponding to a transport block 3 is 3. When the preset order is the ascending order, the terminal device may determine the transport block 1 as the transport block used for initial transmission that carries initially transmitted information, and determine the transport block 2 and the transport block 3 as transport blocks used for retransmission that carry retransmitted information. In addition, the terminal device may determine to first decode information in the transport block 2, and then decode information in the transport block 3. After the decoding, the terminal device combines the information in the transport block 1, the information in the transport block 2, and the information in the transport block 3 sequentially.

Specifically, in this application, time domain resources on which transport blocks are located correspond to start time, and the start time of the time domain resources on which the transport blocks are located are sorted in a preset time order. In this way, the terminal device may determine a transport block on a time domain resource with an earliest start time as the transport block used for initial transmission, or determine a transport block on a time domain resource with a latest start time as the transport block used for initial transmission. This is not limited in this application. For a manner in which the terminal device determines the transport block used for retransmission, based on a start time corresponding to a time domain resource on which each transport block is located, refer to the foregoing manner in which the carrier index number is used as an example. Details are not described herein again in this application.

Specifically, in this application, lengths of time domain resources on which all transport blocks are located are sorted in a preset order, for example, sorted in descending order or in ascending order. For example, a transport block, on a time domain resource that has a shortest length, in the at least two transport blocks is determined as the transport block used for initial transmission; or a transport block, on a time domain resource that has a longest length, in the at least two transport blocks is determined as the transport block used for initial transmission. For a manner in which the terminal device determines the transport block used for retransmission, based on a length of a time domain resource on which each transport block is located, refer to the foregoing manner in which the carrier index number is used as an example. Details are not described herein again in this application.

Specifically, frequency domain resource PRB index numbers of all transport blocks in this application are sorted in a preset order, and the terminal device may determine a transport block, on a frequency domain resource PRB that has a smallest or largest index number, in the at least two transport blocks as the transport block used for initial transmission. Quantities of frequency domain resources PRBs on which all transport blocks are located are sorted in a preset order, and the terminal device may determine a transport block, on a frequency domain resource PRB that has a smallest or largest quantity, in the at least two transport blocks as the transport block used for initial transmission.

Specifically, each transport block in this application corresponds to an RV version, and the terminal device may determine a transport block whose redundancy version is 0 or 3 as the transport block used for initial transmission.

Specifically, each transport block in this application corresponds to a low (high) BLER. For example, a BLER of 10-5 corresponds to the transport block used for initial transmission. A lower block error rate indicates a higher success rate. For example, a BLER of 10-3 corresponds to the transport block used for initial transmission, and fewer resources are consumed when a block error rate is high, thereby reducing resource consumption.

In this application, each transport block corresponds to a modulation and coding scheme (MCS) index. Modulation and coding scheme indexes corresponding to all transport blocks are sorted in a preset order, and the terminal device may determine a transport block with a largest modulation and coding scheme index in the at least two transport blocks as the transport block used for initial transmission. The MCS index corresponds to the block error rate, and a higher MCS index indicates better channel quality. In this case, a low BLER indicates a higher success rate.

Each transport block in this application corresponds to a code rate. The terminal device may determine a transport block with a lowest code rate in the at least two transport blocks as the transport block carrying initial transmission information. The code rate corresponds to a block error rate. A lower code rate indicates a lower block error rate, and therefore indicates a higher success rate.

On the other hand, in Scenario 2, step S104 may be further implemented in the following manner:

S1042. The terminal device decodes at least one transport block that is in the at least two transport blocks and that is used for retransmission, to obtain the first information; and/or the terminal device performs combined decoding on a plurality of transport blocks that are in the at least two transport blocks and that are used for retransmission, to obtain the first information.

It may be understood that the plurality of transport blocks carrying the first information are only used for retransmission, and only one transport block is used to transmit the first information in initial transmission, which is the same as that in the prior art.

Optionally, in this application, the terminal device may determine, a transport block that is transmitted before the at least two transport blocks and that carries information the same as the first information in the at least two transport blocks, as the transport block used for initial transmission. A transport block used for initial transmission may have a BLER of $10e^{-1}$. To save resources, a transport block for retransmission should have a BLER of $10e^{-4}$ or $10e^{-5}$. In this case, retransmission reliability needs to be further improved to ensure overall reliability.

On the other hand, in Scenario 3, step S104 in this application may be further implemented in the following manner.

S1043. The terminal device separately decodes at least one transport block that is in the at least two transport blocks and that is used for initial retransmission, to obtain the first information; and/or the terminal device performs combined decoding on a plurality of transport blocks that are in the at least two transport blocks and that are used for initial transmission, to obtain the first information.

Optionally, time domain resources on which the at least two transport blocks are located in this application partially or completely overlap.

Optionally, in another embodiment of this application, the method 1n this application is further applicable to the following application scenario: When the network device sends the first information to the terminal device, there is still second information. In this case, the network device may send the first information to the terminal device by using a plurality of transport blocks included in the first transport block group, and send the second information to the terminal device by using at least one transport block included in the second transport block group. Specifically, the at least two transport blocks belong to the first transport block group, and the method provided in this application further includes the following step:

S112. The terminal device determines third indication information, where the third indication information is used to indicate a parameter value of at least one parameter corresponding to the second transport block group, and the second information transmitted by using the second transport block group is different from the first information.

It should be noted that time domain resources on which the first transport block group and the second transport block group in this application are located partially or completely overlap. The first transport block group includes at least two transport blocks, and the second transport block group includes at least one transport block. A time domain resource on which the at least one transport block in the at least two transport blocks included in the first transport block group is located and a time domain resource on which the at least one transport block included in the second transport block group is located partially or completely overlap.

Optionally, provided that a time domain resource on which a transport block in the first transport block group is located partially or completely overlaps a transport block in the second transport block group, it is considered that the time domain resource on which the first transport block group is located and the time domain resource on which the second transport block group is located partially or completely overlap.

Optionally, a transport block in a transport block group is a reference transport block, and the transport block may occupy a largest quantity of time domain resources, or occupy an earliest time domain resource start location, or occupy a latest time domain resource end location. If a time domain resource on which a reference transport block in the first transport block is located and a time domain resource on which a reference transport block in the second transport block group is located partially or completely overlap, it is considered that the time domain resource on which the first transport block group is located and the time domain resource on which the reference transport block in the second transport block group is located partially or completely overlap.

For example, information A may be transmitted by using a transport block 1, a transport block 2, and a transport block 3 that are included in the first transport block group, and information a1 is transmitted by using the transport block 1, information a2 is transmitted by using the transport block 2, and information a3 is transmitted by using the transport block 3; and information B may be transmitted by using a transport block 4, a transport block 5, and a transport block 6 that are included in the second transport block group, and information b1 is transmitted by using the transport block 4, information b2 is transmitted by using the transport block 5, and information b3 is transmitted by using the transport block 6. If the information A and the information B are different, the terminal device decodes at least one of the information a1 transmitted by the transport block 1, the information a2 transmitted by the transport block 2, and the information a3 transmitted by the transport block 3, to obtain the information A, and decodes at least one of the information b1 transmitted by the transport block 4, the information b2 transmitted by the transport block 5, and the information b3 transmitted by the transport block 6, to obtain the information B.

When one transport block is included in the second transport block group, and the terminal device receives the first transport block group and the second transport block group within a preset time period, the terminal device may decode second information carried in a transport block in the second transport block group, to obtain the second information. When two or more transport blocks are included in the second transport block group, and the terminal device receives the first transport block group and the second transport block group within a preset time period, the terminal device may determine the first information based on the first transport block group, and determine the second information based on the second transport block group.

It should be noted that, that the first transport block group and the second transport block group partially or completely overlap in time domain may be understood as: When any transport block in the first transport block group and any transport block in the second transport block group completely or partially overlap in time domain, it is considered that the first transport block group and the second transport block group partially or completely overlap in time domain.

The foregoing mainly describes the solutions provided in the embodiments of this application from a perspective of interaction between the network elements. It may be understood that, to implement the foregoing functions, the network elements, such as the network device and the terminal device, include a corresponding hardware structure and/or software module for performing each function. A person of ordinary skill in the art should easily be aware that, in combination with the examples described in the embodiments disclosed in this specification, units, algorithms steps may be implemented in this application by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal device may be divided into function modules based on the foregoing method examples. For example, each function module may be corresponding to each function, or two or more functions may be integrated into one processing module. The integrated module may be implemented in a form of hardware, or may be implemented in a form of a software function module. It should be noted that, in this embodiment of this application, module division is used as an example, and is merely logical function division. In actual implementation, another division manner may be used. Descriptions are provided below by using an example in which function modules are obtained through division based on corresponding functions.

Figure 6:
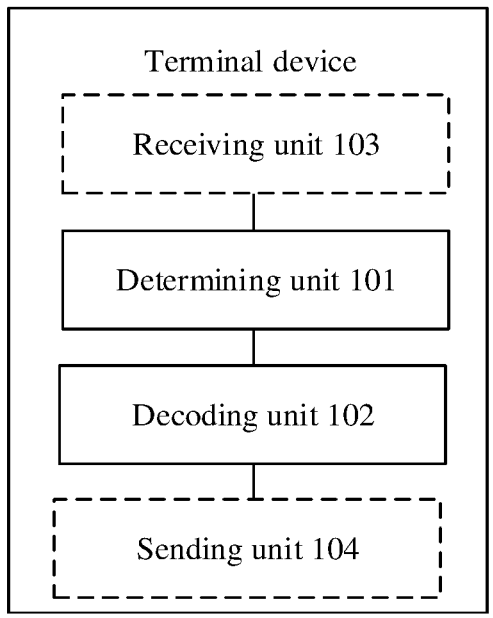
FIG. 6 is a schematic structural diagram 1 of a terminal device according to this application.

If an integrated unit is used, FIG. 6 is a possible schematic structural diagram of the terminal device described in the foregoing embodiments. The terminal device includes a determining unit 101 and a decoding unit 102. The determining unit 101 is configured to support the terminal device in performing steps S103, S1031, S1032, S1033, S1034, and S112 in the foregoing embodiment. The decoding unit 102 is configured to support the terminal device in performing steps S104, S1041, S1042, and S1043 in the foregoing embodiment.

In addition, the terminal device may further include a receiving unit 103 and a sending unit 104. The receiving unit 103 is configured to support the terminal device in performing step S106 in the foregoing embodiment. The sending unit 104 is configured to support the terminal device in performing step S109 in the foregoing embodiment. All related content of the steps in the foregoing method embodiments may be cited in function descriptions of the corresponding function modules. Details are not described herein again.

Figure 7:
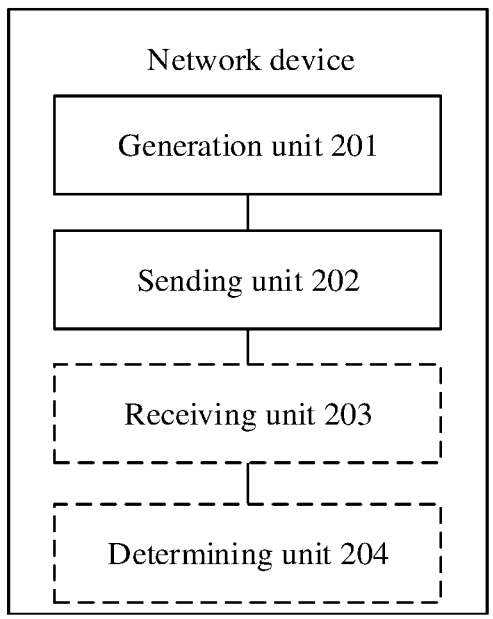
FIG. 7 is a schematic structural diagram 1 of a network device according to this application.

If an integrated unit is used, FIG. 7 is a possible schematic structural diagram of the network device used in the foregoing embodiments. The network device includes a generation unit 201 and a sending unit 202. The generation unit 201 is configured to support the network device in performing step S10 in the foregoing embodiment. The sending unit 202 is configured to support the network device in performing steps S102, S105, and S107 in the foregoing embodiment.

In addition, the network device may further include a receiving unit 203 and a determining unit 204. The receiving unit 203 is configured to support the network device in performing step S110 in the foregoing embodiment. The determining unit 204 is configured to support the network device in performing steps S111, S111, S1112, S1113, S1114, S1115, and S1116 in the foregoing embodiment. All related content of the steps in the foregoing method embodiments may be cited in function descriptions of the corresponding function modules. Details are not described herein again.

It should be understood that division of the units in the apparatus is merely division of logical functions. During actual implementation, all or some of the units may be integrated into a physical entity, or may be physically separated. In addition, the units in the apparatus all may be implemented by software invoked by a processing element; or all may be implemented by hardware; or some units may be implemented by software invoked by a processing element, and some units are implemented by hardware. For example, each unit may be a separately disposed processing element, or may be integrated into a chip of the apparatus for implementation. In addition, each unit may be stored in a memory in a form of a program and invoked by a processing element of the apparatus to perform a function of the unit. In addition, the units may be completely or partially integrated together or may be individually implemented. The processing element herein may be an integrated circuit and has a signal processing capability. In an implementation process, the steps of the foregoing methods or the foregoing units may be implemented by using an integrated logic circuit of hardware in the processor element, or may be implemented by using software invoked by the processing element.

For example, the units in any one of the foregoing apparatuses may be configured as one or more integrated circuits for implementing the foregoing methods, for example, one or more application-specific integrated circuits (ASIC), or one or more microprocessors (DSP), or one or more field programmable gate arrays (FPGA). For another example, when the units in the apparatus may be implemented by a program scheduled by a processing element, the processing element may be a general-purpose processor, for example, a central processing unit (CPU) or another processor that can invoke a program. For another example, the units can be integrated together and implemented in a form of a system-on-a-chip (SOC).

The foregoing receiving unit (or a unit used for receiving) is an interface circuit of the apparatus, configured to receive a signal from another apparatus. For example, when the apparatus is implemented in a form of a chip, the receiving unit is an interface circuit that is the chip and that is configured to receive a signal from another chip or apparatus. The foregoing sending unit (or a unit used for sending) is an interface circuit of the apparatus, configured to send a signal to another apparatus. For example, when the apparatus is implemented in a form of a chip, the sending unit is an interface circuit that is the chip and that is configured to send a signal to another chip or apparatus.

Figure 8:
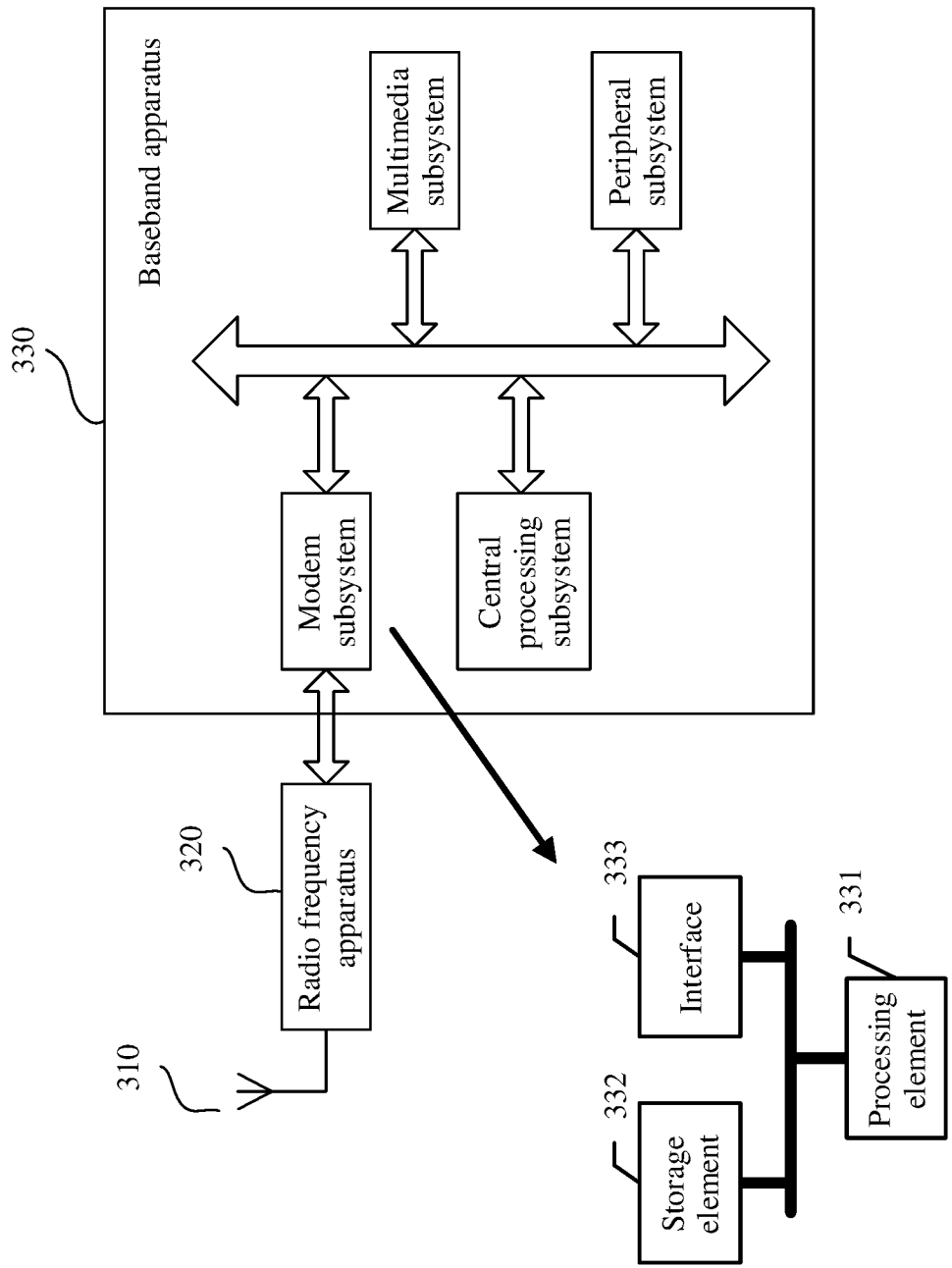
FIG. 8 is a schematic structural diagram 2 of a terminal device according to this application.

FIG. 8 is a schematic structural diagram of a terminal device according to an embodiment of this application. The terminal device may be the terminal device in the foregoing embodiments and is configured to implement the operations of the terminal device in the foregoing embodiments. As shown in FIG. 8, the terminal device includes: an antenna 310, a radio frequency apparatus 320, and a baseband apparatus 330. The antenna 310 is connected to the radio frequency apparatus 320. In a downlink direction, the radio frequency apparatus 320 receives, by using the antenna 310, information sent by a network device, and sends the information sent by the network device, to the baseband apparatus 330 for processing. In an uplink direction, the baseband apparatus 330 processes information of the terminal and sends the information to the radio frequency apparatus 320, and the radio frequency apparatus 320 processes the information of the terminal and then sends the information to the network device by using the antenna 310.

The baseband apparatus 330 may include a modem subsystem, configured to implement data processing at each communications protocol layer. A central processing subsystem is further included, to implement processing in an operating system of the terminal and at an application layer. In addition, the baseband apparatus 330 may further include another subsystem such as a multimedia subsystem or a peripheral subsystem. The multimedia subsystem is configured to control a camera or a screen display of the terminal, and the peripheral subsystem is configured to connect to another device. The modem subsystem may be a separately disposed chip. Optionally, the foregoing information transmission apparatus may be implemented in the modem subsystem.

In an implementation, each unit shown in FIG. 6 is implemented by a program scheduled by a processing element. For example, a subsystem of the baseband apparatus 330, such as the modem subsystem, includes a processing element 331 and a storage element 332. The processing element 331 invokes a program stored in the storage element 332 to perform the method performed by the terminal in the foregoing method embodiments. In addition, the baseband apparatus 330 may further include an interface 333, configured to exchange information with the radio frequency apparatus 320. Specifically, the processing element 331 is configured to perform steps S103, S1031, S1032, S1033, S1034, S112, S104, S1041, S1042, and S1043 in the foregoing embodiment. The interface 333 is configured to perform steps S106 and S109 in the foregoing embodiment.

In another implementation, the units shown in FIG. 6 may be configured as one or more processing elements that implement the foregoing methods performed by the terminal device. These processing elements are disposed on a subsystem of the baseband apparatus 330, such as the modem subsystem. The processing element herein may be an integrated circuit, for example, one or more ASICs, one or more DSPs, or one or more FPGAs. These integrated circuits may be integrated together to form a chip.

For example, the units shown in FIG. 6 may be integrated and implemented in a form of a system-on-a-chip (SOC). For example, the baseband apparatus 330 includes an SOC chip, configured to implement the foregoing methods. The processing element 331 and the storage element 332 may be integrated into the chip, and the processing element 331 invokes the program stored in the storage element 332 to implement the foregoing methods performed by the terminal or the functions of the units shown in FIG. 6. Alternatively, at least one integrated circuit may be integrated into the chip, to implement the foregoing methods performed by the terminal device or the functions of the units shown in FIG. 6. Alternatively, with reference to the foregoing implementations, functions of some units are implemented in a form of a program invoked by a processing element, and functions of some units are implemented in a form of an integrated circuit.

In conclusion, the information transmission apparatus applied to the terminal device includes the at least one processing element and the storage element. The at least one processing element is configured to perform the method performed by the terminal device provided in the foregoing method embodiments. The processing element may perform some or all of the steps performed by the terminal device in the foregoing method embodiments, in a first manner: executing the program stored in the storage element; or may perform some or all of the steps performed by the terminal in the foregoing method embodiments, in a second manner: using an integrated logical circuit of hardware in the processing element in combination with an instruction; or may certainly perform some or all of the steps performed by the terminal in the foregoing method embodiments with reference to the first manner and the second manner.

As described above, the processing element herein may be a general-purpose processor, for example, a central processing unit (CPU), or may be one or more integrated circuits configured to implement the foregoing methods, for example, one or more application-specific integrated circuits (ASIC), or one or more microprocessors (DSP), or one or more field programmable gate arrays (FPGA).

The storage element may be a memory, or a general name of a plurality of storage elements.

Figure 9:
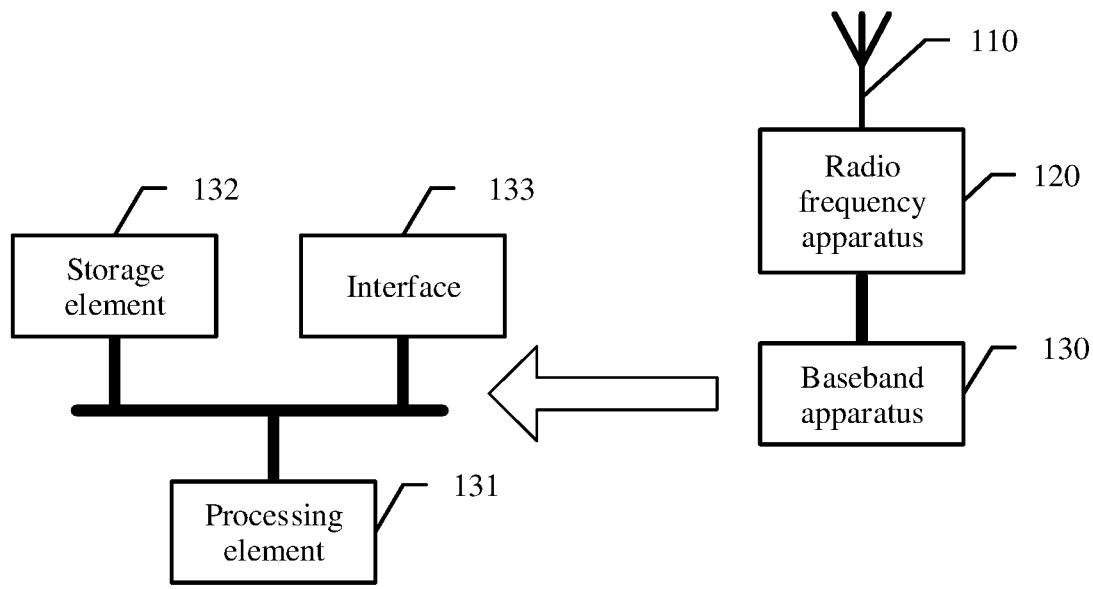
FIG. 9 is a schematic structural diagram 2 of a network device according to this application.

FIG. 9 is a schematic structural diagram of a network device according to an embodiment of this application. The network device may be the network device in the foregoing embodiments, and is configured to implement the operations of the network device in the foregoing embodiments. As shown in FIG. 9, the network device includes an antenna 110, a radio frequency apparatus 120, and a baseband apparatus 130. The antenna 110 is connected to the radio frequency apparatus 120. In an uplink direction, the radio frequency apparatus 120 receives, by using the antenna 110, information sent by a terminal device, and sends the information sent by the terminal device, to the baseband apparatus 130 for processing. In a downlink direction, the baseband apparatus 130 processes information of the terminal device and sends the information to the radio frequency apparatus 120, and the radio frequency apparatus 120 processes the information of the terminal device and then sends the information to the terminal by using the antenna 110.

The baseband apparatus 130 may be a physical apparatus, or may include at least two apparatuses that are physically separated. The baseband apparatus 130 and the radio frequency apparatus 120 may be integrated together, or may be physically separated. The baseband apparatus 130 may include at least one baseband board, and a plurality of processing elements may be integrated on the baseband board to implement a baseband processing function. The network device is a RAN device, for example, an eNB in an LTE system. In this case, the baseband apparatus 130 may be a baseband apparatus in the eNB. For another example, the network device may be the RAN device shown in FIG. 2 or FIG. 3, and the baseband apparatus may be a DU node.

The foregoing information transmission apparatus may be located in the baseband apparatus 130. In an implementation, each unit shown in FIG. 7 is implemented by a program scheduled by a processing element. For example, the baseband apparatus 130 includes a processing element 131 and a storage element 132. The processing element 131 invokes a program stored in the storage element 132 to perform the method performed by the network device in the foregoing method embodiments, for example, S10. In addition, the baseband apparatus 130 may further include an interface 133, configured to exchange information with the radio frequency apparatus 120. The interface is, for example, a common public radio interface (CPRI). When the baseband apparatus 130 and the radio frequency apparatus 120 are physically disposed together, the interface may be an intra-board interface or an inter-board interface. The board herein is a circuit board, and the interface 133 is configured to perform S111, S1111, S1112, S1113, S1114, S1115, and S1116.

In another implementation, the units shown in FIG. 7 may be configured as one or more processing elements that implement the foregoing methods performed by the network device. These processing elements are disposed on the baseband apparatus 130. The processing element herein may be an integrated circuit, for example, one or more ASICs, one or more DSPs, or one or more FPGAs. These integrated circuits may be integrated together to form a chip.

For example, the units shown in FIG. 7 may be integrated and implemented in a system-on-a-chip (system-on-a-chip, SOC). For example, the baseband apparatus 130 includes an SOC chip, configured to implement the foregoing methods. The processing element 11 and the storage element 132 may be integrated into the chip, and the processing element 131 invokes the program stored in the storage element 132 to implement the foregoing methods performed by the network device or the functions of the units shown in FIG. 7. Alternatively, at least one integrated circuit may be integrated into the chip, to implement the foregoing methods performed by the network device or the functions of the units shown in FIG. 7. Alternatively, with reference to the foregoing implementations, functions of some units may be implemented in a form of a program invoked by a processing element, and functions of some units may be implemented in a form of an integrated circuit.

In conclusion, the information transmission apparatus applied to the network device includes the at least one processing element and the storage element. The at least one processing element is configured to perform the method performed by the network device provided in the foregoing embodiments. The processing element may perform some or all of the steps performed by the network device in the foregoing embodiments in a first manner: executing the program stored in the storage element, or may perform some or all of the steps, for example, steps S110, S111, S1111, S1112, S1113, S1114, S1115, and S1116, performed by the network device in the foregoing embodiments in a second manner: using an integrated logic circuit of hardware in the processor element in combination with an instruction, or may certainly perform some or all of the steps performed by the network device in the foregoing embodiments with reference to the first manner and the second manner.

As described above, the processing element herein may be a general-purpose processor, for example, a central processing unit (CPU), or may be one or more integrated circuits configured to implement the foregoing methods, for example, one or more application-specific integrated circuits (ASIC), or one or more microprocessors (DSP), or one or more field programmable gate arrays (FPGA).

The storage element may be a memory, or a general name of a plurality of storage elements.

Figure 10:
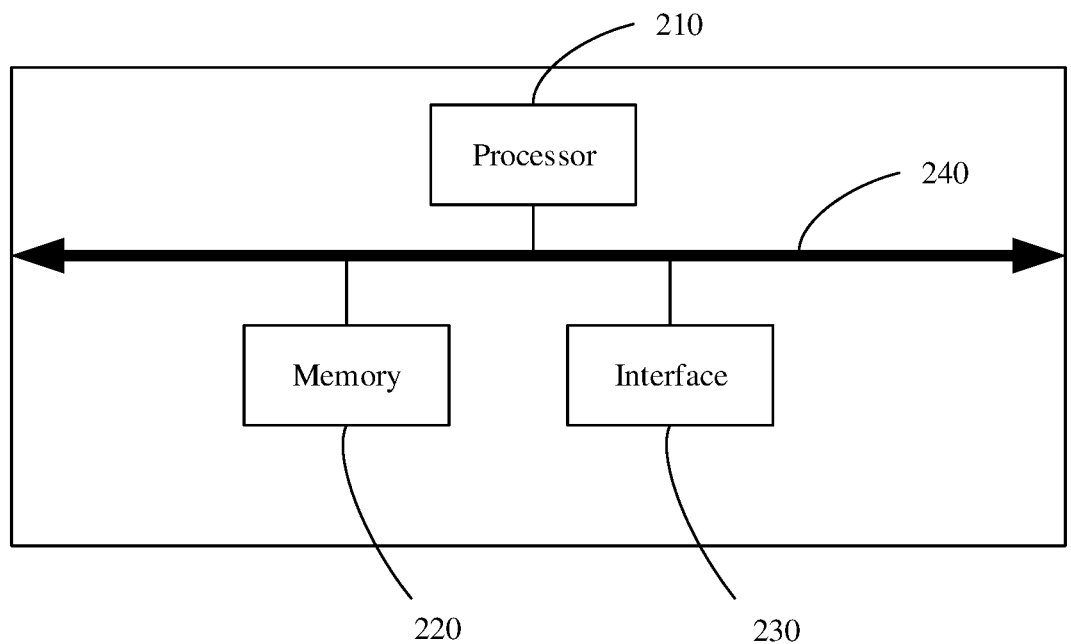
FIG. 10 is a schematic structural diagram 3 of a network device according to this application.

FIG. 10 is a schematic structural diagram of another network device according to an embodiment of this application. The network device may be the network device in the foregoing embodiments, and is configured to implement the operations of the network device in the foregoing embodiments.

As shown in FIG. 10, the network device includes a processor 210, a memory 220, and an interface 230. The processor 210, the memory 220, and the interface 230 are connected by using a bus 240. The bus may be implemented by using a connection circuit. The memory 220 is configured to store a program. When the program is invoked by the processor 210, the method performed by the network device in the foregoing embodiments may be implemented. The interface 230 is configured to implement communication with another network device.

The foregoing information transmission apparatus is located in the network device, and functions of the units may be implemented by the processor 210 by invoking the program stored in the memory 220. That is, the foregoing information transmission apparatus includes the memory and the processor. The memory is configured to store the program, and the processor invokes the program to perform the methods in the foregoing method embodiments. The processor herein may be a general-purpose processor, for example, a central processing unit (CPU), or may be another processor that can invoke a program. Alternatively, the processor may be configured as one or more integrated circuits that implement the methods performed by the network device in the foregoing embodiments, for example, one or more application-specific integrated circuits (ASIC), one or more microprocessors (DSP), or one or more field programmable gate arrays (FPGA). A quantity of memories is not limited, and there may be one or more memories.

Figure 11:
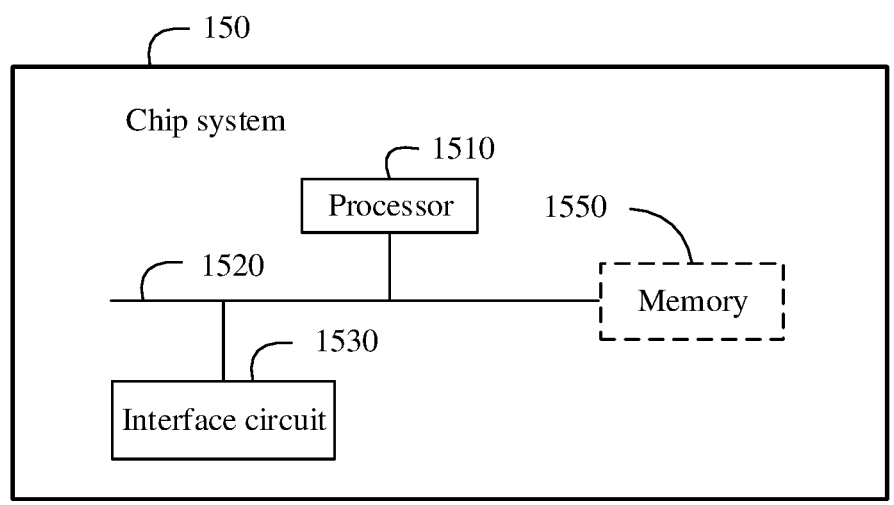
FIG. 11 is a schematic structural diagram of a chip system according to this application.

FIG. 11 is a schematic structural diagram of a chip system 150 according to an embodiment of the present invention. The chip system 150 includes at least one processor 1510 and an interface circuit 1530.

Optionally, the chip system 150 further includes a memory 1550. The memory 1550 may include a read-only memory and a random access memory, and provides an operation instruction and data for the processor 1510. A part of the memory 1550 may further include a non-volatile random access memory (NVRAM).

In some implementation, the memory 1550 stores the following elements: an executable module or a data structure, or a subset thereof, or an extended set thereof.

In this embodiment of the present invention, a corresponding operation is performed by invoking the operation instruction stored in the memory 1550 (where the operation instruction may be stored in an operating system).

In a possible implementation, structures of chip systems used by a terminal device and a network device are similar, and different apparatuses may use different chip systems to implement respective functions.

The processor 1510 controls operations of the terminal device and the network device, and the processor 1510 may also be referred to as a CPU. The memory 1550 may include a read-only memory and a random access memory, and provide an instruction and data for the processor 1510. A part of the memory 1550 may further include an NVRAM. In a specific application, the memory 1550, the interface circuit 1530, and the memory 1550 are coupled together by using a bus system 1520. The bus system 1520 further includes a power supply bus, a control bus, a status signal bus, and the like in addition to a data bus. However, for clear description, various types of buses in FIG. 11 are marked as the bus system 1520.

The methods disclosed in the foregoing embodiments of the present invention may be applied to the processor 1510, or implemented by the processor 1510. The processor 1510 may be an integrated circuit chip and has a signal processing capability. In an implementation process, steps in the foregoing methods can be implemented by using a hardware integrated logical circuit in the processor 1510, or by using instructions in a form of software. The processor 1510 may be a general purpose processor, a digital signal processor (DSP), an application specific integrated circuit (ASIC), a field-programmable gate array (FPGA) or another programmable logical device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1550, and a processor 1510 reads information in the memory 1550 and completes the steps in the foregoing methods in combination with hardware of the processor.

Figure 5:
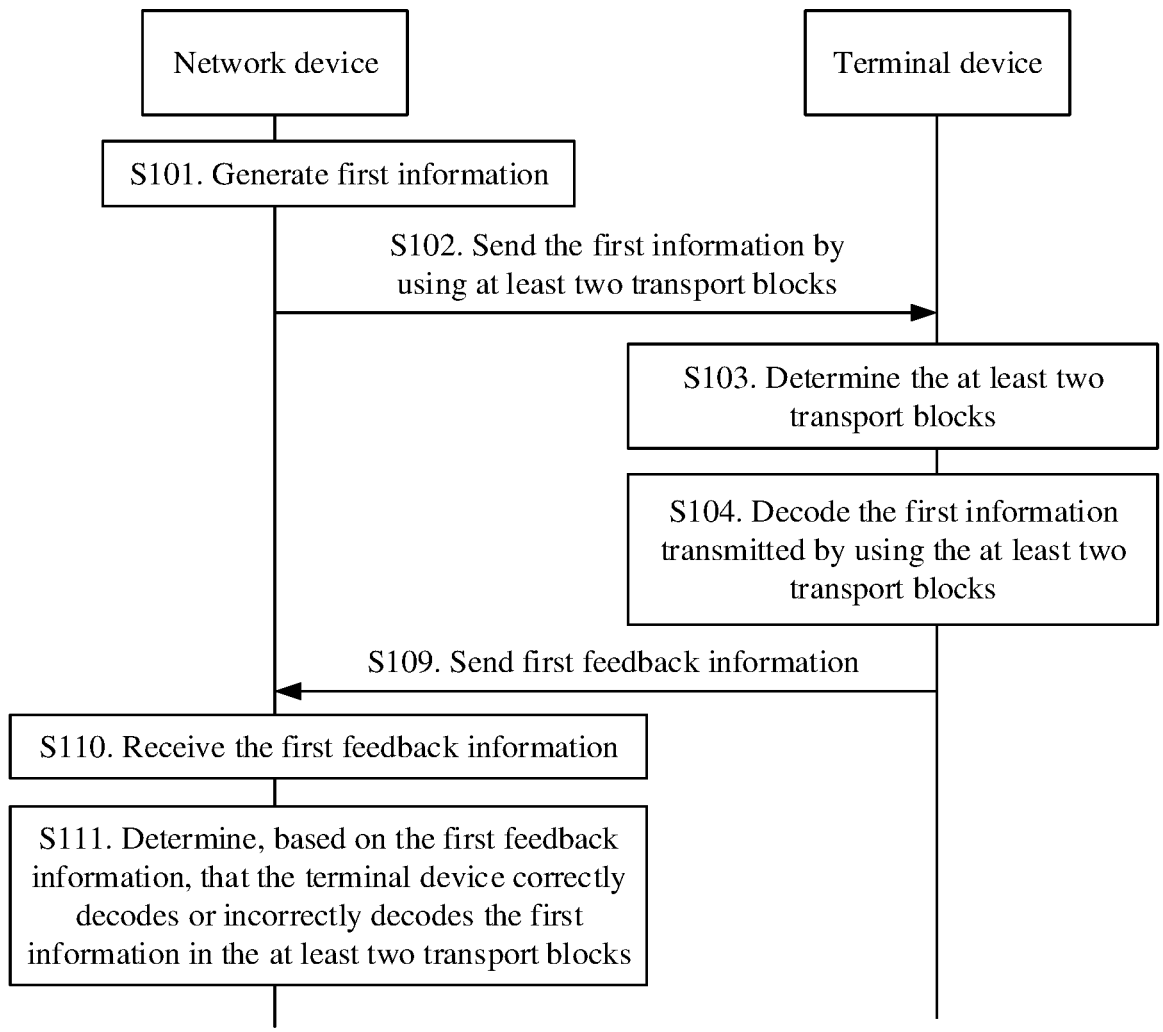
FIG. 5 is a schematic flowchart 2 of an information transmission method according to this application.

Optionally, the interface circuit 1530 is configured to perform the receiving and sending steps of the network device and the terminal device in the embodiments shown in FIG. 4 and FIG. 5.

The processor 1510 is configured to perform the processing steps of the network device and the terminal device in the embodiments shown in FIG. 4 and FIG. 5.

In the foregoing embodiments, the instruction that is stored in the memory and that is to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk, SSD), or the like.

According to one aspect, a computer storage medium is provided. The computer-readable storage medium stores an instruction. When the instruction is run, a terminal device is enabled to perform S103, S1031, S1032, S1033, S1034, S112, S104, S1041, S1042, S1043, S106, and S109 in the embodiments, and/or another process performed by the terminal device by using the technology described in this specification.

According to another aspect, a computer storage medium is provided. The computer-readable storage medium stores an instruction. When the instruction is run, a network device is enabled to perform steps S102, S105, S107, S110, S111, S1111, S1112, S1113, S1114, S115, and S116 in the embodiments, and/or another process performed by the network device by using the technology described in this specification.

According to one aspect, a computer program product including an instruction is provided. The computer program product stores the instruction. When the instruction is run, a terminal device is enabled to perform S103, S1031, S1032, S1033, S1034, S112, S104, S1041, S1042, S1043, S106, and S109 in the embodiments, and/or another process performed by the terminal device by using the technology described in this specification.

According to another aspect, a computer program product including an instruction is provided. The computer program product stores the instruction. When the instruction is run, a network device is enabled to perform S102, S105, S107, S110, S111, S1111, S1112, S1113, S1114, S1115, and S1116 in the embodiments, and/or another process performed by the network device by using the technology described in this specification.

According to one aspect, a chip system is provided. The chip system is applied to a terminal device, the chip system includes at least one processor and an interface circuit, the interface circuit and the at least one processor are interconnected by using a line, and the processor is configured to run an instruction, to perform S103, S1031, S1032, S1033, S1034, S112, S104, S1041, S1042, S1043, S106, and S109 in the embodiments, and/or another process performed by the terminal device by using the technology described in this specification.

According to another aspect, a chip system is provided. The chip system is applied to a network device, the chip system includes at least one processor and an interface circuit, the interface circuit and the at least one processor are interconnected by using a line, and the processor is configured to run an instruction, to perform steps S102, S105, S107, S110, S111, S1111, S1112, S1113, S1114, S1115, and S1116 in the embodiments, and/or another process performed by the network device by using the technology described in this specification.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a terminal device, indication information indicating two combination identifiers respectively corresponding to two physical downlink shared channels (PDSCHs);
   determining, by the terminal device, the two PDSCHS based on the two combination identifiers, wherein same information is carried by each of the two PDSCHs, the two PDSCHs are transmitted on same time domain resources and on different frequency domain resources, and redundancy versions (RVs) of the two PDSCHs are different; and decoding, by the terminal device, first information transmitted using the two PDSCHs, wherein the first information comprises control information or data, and wherein decoding the first information transmitted using the two PDSCHs comprises:
performing, by the terminal device, decoding on at least one PDSCH of the two PDSCHs or combined decoding on the two PDSCHs, to obtain the first information.

2. The method according to claim 1, wherein the indication information is carried in downlink control information (DCI), and the DCI indicates at least one of the time domain resources or the frequency domain resources of the two PDSCHs.

3. The method according to claim 1, wherein the indication information further indicates a parameter value of at least one parameter, wherein the two PDSCHs correspond to a same parameter value of the at least one parameter, and the at least one parameter comprises:
a bandwidth part (BWP);
a network identifier;
a cell index;
a hybrid automatic repeat request (HARQ) process number;
a new data indicator (NDI); or
an HARQ-ACK resource.

4. The method according to claim 1, further comprising:
sending, by the terminal device, first feedback information, wherein the first feedback information indicates whether the terminal device has correctly decoded the first information transmitted by the two PDSCHs, and a size of the first feedback information is 1 bit.

5. The method according to claim 1, wherein before determining, by the terminal device, the two PDSCHs, the method further comprises:
receiving, by the terminal device, first configuration information, wherein the first configuration information is usable to configure the terminal device to perform combined decoding on two PDSCHs.

6. An apparatus, comprising:
one or more processors, and
a non-transitory storage medium in communication with the one or more processors, the non-transitory storage medium storing program instructions, wherein, when executed by the one or more processors, the program instructions cause the apparatus to:
receive indication information indicating two combination identifiers respectively corresponding to two physical downlink shared channels (PDSCHs);
determine the two PDSCHS based on the two combination identifiers, wherein same information is carried by each of the two PDSCHs, the two PDSCHs are transmitted on same time domain resources and on different frequency domain resources, and redundancy versions (RVs) of the two PDSCHs are different; and
decode first information transmitted using the two PDSCHs, wherein the first information comprises control information or data, and wherein decoding the first information comprises:
performing decoding on at least one PDSCH of the two PDSCHs or combined decoding on the two PDSCHs, to obtain the first information.

7. The apparatus according to claim 6, wherein the indication information is carried in downlink control information (DCI), and the DCI indicates at least one of the time domain resources or the frequency domain resources of the two PDSCHs.

8. The apparatus according to claim 6, wherein the indication information further indicates a parameter value of at least one parameter, wherein the two PDSCHs correspond to a same parameter value of the at least one parameter, and the at least one parameter comprises:
a bandwidth part (BWP);
a network identifier;
a cell index;
a hybrid automatic repeat request (HARQ) process number;
a new data indicator (NDI); or
an HARQ-ACK resource.

9. The apparatus according to claim 6, wherein, when executed by the one or more processors, the program instructions further cause the apparatus to:
send first feedback information, wherein the first feedback information indicates that the apparatus has correctly decoded or incorrectly decoded the first information transmitted by the two PDSCHs, and a size of the first feedback information is 1 bit.

10. The apparatus according to claim 6, wherein, when executed by the one or more processors, the program instructions further cause the apparatus to:
before determining the two PDSCHs, receive first configuration information, wherein the first configuration information configures the apparatus to perform combined decoding on two PDSCHs.

11. An apparatus, comprising:
one or more processors, and
a non-transitory storage medium in communication with the one or more processors, the non-transitory storage medium storing program instructions, wherein, when executed by the one or more processors, the program instructions cause the apparatus to:
send indication information to a terminal device, wherein the indication information indicates two combination identifiers respectively corresponding to two physical downlink shared channels (PDSCHs);
generate first information, wherein the first information comprises data or control information; and
send the first information to a terminal device using the two PDSCHs indicated by the two combination identifiers, wherein the first information is carried by each of the two PDSCHs, wherein the two PDSCHs are transmitted on same time domain resources and on different frequency domain resources, and redundancy versions (RVs) of the two PDSCHs are different.

12. The apparatus according to claim 11, wherein, when executed by the one or more processors, the program instructions further cause the apparatus to:
receive first feedback information from the terminal device, wherein the first feedback information indicates whether the terminal device has correctly decoded the first information transmitted by the two PDSCHs, and the size of the first feedback information is 1 bit.

13. The apparatus according to claim 11, wherein, when executed by the one or more processors, the program instructions further cause the apparatus to:
send first configuration information to the terminal device, wherein the first configuration information is usable to configure the terminal device to perform combined decoding on the two PDSCHs.

14. The apparatus according to claim 11, wherein the indication information is carried in downlink control information (DCI), and the DCI indicates at least one of the time domain resources or the frequency domain resources of the two PDSCHs.

15. The apparatus according to claim 11, wherein the indication information further indicates a parameter value of at least one parameter, wherein the two PDSCHs correspond to a same parameter value of the at least one parameter, and the at least one parameter comprises:
- a bandwidth part (BWP);
- a network identifier;
- a cell index;
- a hybrid automatic repeat request (HARQ) process number;
- a new data indicator (NDI); or
- an HARQ-ACK resource.

* * * * *

UNITED STATES PATENT AND TRADEMARK OFFICE
CERTIFICATE OF CORRECTION

PATENT NO. : 11,588,585 B2
APPLICATION NO. : 16/925593
DATED : February 21, 2023
INVENTOR(S) : Shao It is certified that error appears in the above-identified patent and that said Letters Patent is hereby corrected as shown below:

In the Specification

In the Detailed Description of Illustrative Embodiments, Column 46, Line 41; delete "S134" and insert --S1034--.

In the Detailed Description of Illustrative Embodiments, Column 51, Line 25; delete "S10" and insert --S110--.

In the Detailed Description of Illustrative Embodiments, Column 51, Line 27; delete "S11" and insert --S111--.

In the Detailed Description of Illustrative Embodiments, Column 51, Line 66; delete "S11" and insert --S111--.

In the Detailed Description of Illustrative Embodiments, Column 59, Line 9; delete "S10" and insert --S101--.

In the Detailed Description of Illustrative Embodiments, Column 59, Line 17; delete "S111, S111" and insert --S111, S1111--.

In the Detailed Description of Illustrative Embodiments, Column 59, Line 62; insert --of-- between "is" and "the".

In the Detailed Description of Illustrative Embodiments, Column 60, Line 1; insert --of-- between "is" and "the".

In the Detailed Description of Illustrative Embodiments, Column 62, Line 6; delete "S10" and insert --S110--.

Signed and Sealed this
Fourth Day of April, 2023

Katherine Kelly Vidal
*Director of the United States Patent and Trademark Office*

In the Detailed Description of Illustrative Embodiments, Column 62, Line 29; delete "11" and insert --111--.